US007491142B2

(12) United States Patent
Takuroh et al.

(10) Patent No.: US 7,491,142 B2
(45) Date of Patent: Feb. 17, 2009

(54) BELT DRIVING DEVICE, DRIVING DEVICE, METHOD, IMAGE FORMING APPARATUS

(75) Inventors: Kamiya Takuroh, Suginami-ku (JP); Koide Hiroshi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 334 days.

(21) Appl. No.: 10/663,766

(22) Filed: Sep. 17, 2003

(65) Prior Publication Data

US 2004/0127317 A1 Jul. 1, 2004

(30) Foreign Application Priority Data

Sep. 19, 2002 (JP) ............................ 2002-274100

(51) Int. Cl.
*F16H 7/08* (2006.01)
*F16H 55/14* (2006.01)
*F16F 15/12* (2006.01)
*G03G 15/00* (2006.01)

(52) U.S. Cl. ........................... 474/137; 474/94; 474/87; 474/139; 399/167; 399/176; 74/574.4

(58) Field of Classification Search ............. 474/85-87, 474/91, 136, 137, 139; 399/101, 302, 308, 399/297, 37, 88; 355/200, 271, 272-273; 74/574.2, 574.4; 464/71; 482/57; 242/419.9
See application file for complete search history.

(56) References Cited

U.S. PATENT DOCUMENTS 2,724,377 A * 11/1955 Nallinger ..................... 464/71
2,743,922 A * 5/1956 Hoehn ........................ 226/169

(Continued)

FOREIGN PATENT DOCUMENTS

DE 19831159 A1 * 1/2000

(Continued)

OTHER PUBLICATIONS

Patent Abstracts of Japan, JP 2002-250400, Sep. 6, 2002.

(Continued)

*Primary Examiner*—Marcus Charles
(74) *Attorney, Agent, or Firm*—Oblon, Spivak, McClelland, Maier & Neustadt, P.C.

(57) ABSTRACT

A belt driving device is provided and includes a plurality of rollers including a driving roller. A belt is configured to be tensioned by the plurality of rollers, and to be driven by the driving roller. The driving roller is arranged adjacent to where an outside body contacts an outer surface of the belt. A pair of fluctuation absorbing members may be configured to absorb tensional fluctuation of the belt at an upstream and a downstream of a cleaning member in a direction which the belt is driven. A detecting means may be utilized to detect a driving load of one of the driving roller and the outside roller and a controller is configured to drive another roller of the driving roller and the outside roller based on the driving load detected by the detecting means. An outside roller may be configured to contact an outer surface of the belt and to be driven by a second motor; a controller configured to control the second motor by a less loop gain than a loop gain to control the first motor.

20 Claims, 21 Drawing Sheets

U.S. PATENT DOCUMENTS

| | | | | |
|---|---|---|---|---|
| 2,961,894 | A * | 11/1960 | Oles | 74/574.4 |
| 5,510,886 | A * | 4/1996 | Sugimoto et al. | 399/308 |
| 5,515,145 | A * | 5/1996 | Sasaki et al. | 399/302 |
| 5,638,354 | A | 6/1997 | Nakayama et al. | |
| 5,655,416 | A * | 8/1997 | Mott et al. | 74/574.2 |
| 5,697,031 | A | 12/1997 | Kamiya et al. | |
| 5,725,457 | A * | 3/1998 | Maresh | 482/57 |
| 5,737,307 | A | 4/1998 | Shimizu | |
| 5,740,493 | A | 4/1998 | Otaki et al. | |
| 5,761,594 | A * | 6/1998 | Seto et al. | 399/302 |
| 5,790,511 | A | 8/1998 | Juso et al. | |
| 5,812,520 | A | 9/1998 | Nakayama et al. | |
| 5,822,286 | A | 10/1998 | Nakayama et al. | |
| 6,175,702 | B1 * | 1/2001 | Takeuchi et al. | 399/101 |
| 6,269,228 | B1 * | 7/2001 | Kayahara et al. | 399/37 |
| 6,326,578 | B1 * | 12/2001 | Hosaka | 242/419.9 |
| 6,343,053 | B1 | 1/2002 | Akanuma et al. | |
| 6,445,656 | B1 | 9/2002 | Koide | |
| 6,448,997 | B1 | 9/2002 | Koide | |
| 6,460,455 | B1 * | 10/2002 | Eltner et al. | 101/148 |
| 6,487,149 | B1 | 11/2002 | Yokoi et al. | |
| 6,507,713 | B2 | 1/2003 | Koide | |
| 6,545,958 | B1 | 4/2003 | Hirai et al. | |
| 2002/0003755 | A1 | 1/2002 | Fujita et al. | |
| 2002/0181362 | A1 | 12/2002 | Koide | |
| 2003/0035660 | A1 * | 2/2003 | Sugino et al. | 399/111 |
| 2003/0151999 | A1 | 8/2003 | Hirai et al. | |
| 2003/0175052 | A1 * | 9/2003 | Adachi et al. | 399/265 |
| 2004/0127317 | A1 | 7/2004 | Takuroh et al. | |

FOREIGN PATENT DOCUMENTS

| | | | |
|---|---|---|---|
| EP | 0 568 829 | | 11/1993 |
| JP | 04226362 | A * | 8/1992 |
| JP | 8-115041 | | 5/1996 |
| JP | 10-326068 | | 12/1998 |
| JP | 11-272094 | | 10/1999 |
| JP | 2001-343843 | | 12/2001 |
| JP | 2002-244378 | | 8/2002 |

OTHER PUBLICATIONS

Patent Abstracts of Japan, JP 62-040442, Feb. 21, 1987.
U.S. Appl. No. 11/045,292, filed Jan. 31, 2005, Kamiya.
U.S. Appl. No. 10/663,766, filed Sep. 17, 2003, Takuroh.
U.S. Appl. No. 10/855,741, filed May 28, 2004, Kamiya.
U.S. Appl. No. 10/663,766, filed Sep. 17, 2003, Takuroh et al.
U.S. Appl. No. 10/864,524, filed Jun. 10, 2004, Kato.
U.S. Appl. No. 11/011,217, filed Dec. 15, 2004, Kamiya.
U.S. Appl. No. 11/558,645, filed Nov. 10, 2006, Takahashi et al.
U.S. Appl. No. 11/495,639, filed Jul. 31, 2006, Komatsu, et al.

* cited by examiner

BELT DRIVING DEVICE, DRIVING DEVICE, METHOD, IMAGE FORMING APPARATUS

BACKGROUND OF THE INVENTION

The present invention relates to a belt driving device, a driving device, belt driving method, driving method, an image forming apparatus.

The image forming apparatus such as a copier, a facsimile, or a printer fixes a toner image onto a recording medium with heat, to make a copied or a recorded medium. Belt driving devices are known for use with an image forming apparatus.

A schematic front view of a background image forming apparatus of tandem type is shown in FIG. 22. The image forming apparatus includes four image forming members 1, four transfer rollers 2, a conveying belt 3, a feeding unit 6, a fixing device 7, and four developing units 8. According to this structure, each developing unit 8 forms a static potential image on each image forming member 1 into the visible static image as toner images. The feeding unit 6 sends the recording medium S along belt 3. The belt 3 is synchronized with respect to the application of the toner images forming on the image forming member 1. In this way, each transfer roller 4 sequentially transfers the toner images from each image forming member 1 onto the recording medium S, the toner images fixed onto the recording medium S at fixing device 7.

A schematic front view of another background image forming apparatus of tandem type is shown in FIG 23. The image forming apparatus includes an intermediate transfer belt 4, and a cleaning member 9 in addition to the background image forming apparatus of FIG 22. According to this structure, each transfer roller 2 sequentially transfers the toner images from each image forming member 1 onto the intermediate transfer belt 4. The toner images on the intermediate transfer belt 4 are transferred onto the recording medium S in a nip between the intermediate transfer belt 4 and the conveying belt 5. Then cleaning member 9 removes the residual toner from the intermediate transfer belt 4.

Japanese Published Unexamined Patent Application NO. Hei 10-268595 shows an image forming apparatus similar type to the image forming apparatus in FIG. 23. In this application, two pressing rollers, which press the intermediate transfer belt, are arranged across the nip where the toner images on the intermediate transfer belt are transferred onto the recording medium. Thus, velocity fluctuation arising at the nip is prevented from dispersing toward the portion not across the nip on the intermediate transfer belt. However this structure does not completely eliminate the intermediate transfer belt.

SUMMARY OF THE INVENTION

A belt driving device is provided and includes a plurality of rollers including a driving roller. A belt is configured to be tensioned by the plurality of rollers, and to be driven by the driving roller; wherein the driving roller is arranged adjacent to where an outside body contacts an outer surface of the belt.

In a further aspect of the invention, a pair of fluctuation absorbing members configured to absorb tensional fluctuation of the belt at an upstream and a downstream of a cleaning member in a direction which the belt is driven.

In another aspect of the invention, a detecting means for detecting driving load of one of the driving roller and the outside roller; a controller configured to drive another roller of the driving roller and the outside roller based on the driving load detected by the detecting means.

In still another aspect of the invention, an outside roller configured to contact an outer surface of the belt and to be driven by a second motor; a controller configured to control the second motor by a less loop gain than a loop gain to control the first motor.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
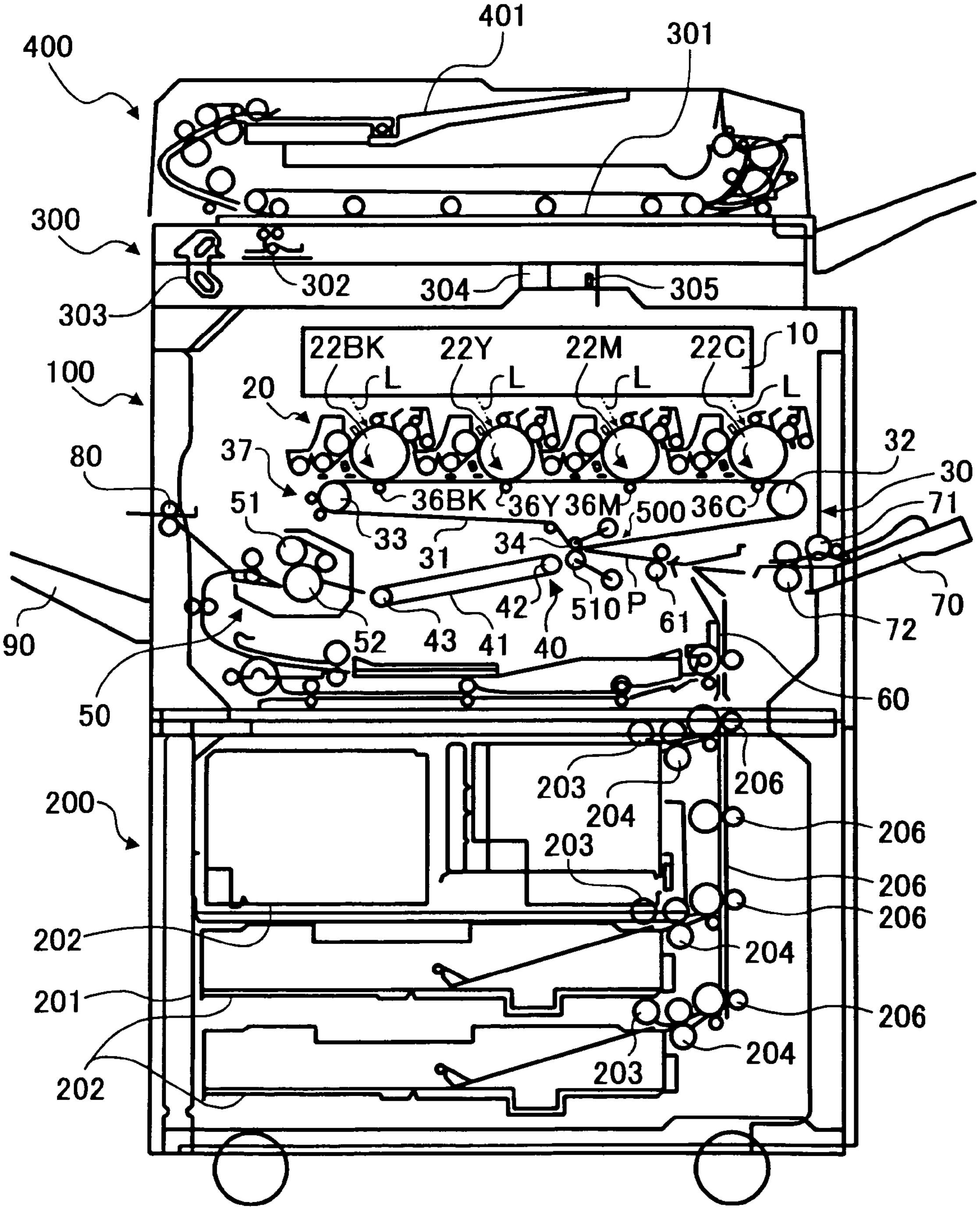
FIG. 1 is a schematic front view showing a color laser copier of tandem type, as an image forming apparatus according to an exemplary embodiment of the present invention.

Hereinafter, the description will be made of embodiments of the present invention with reference to the drawings, wherein like reference numerals designate like or corresponding parts through the several views.

FIG. 1 is a schematic front view showing a color laser copier of tandem type, as an image forming apparatus according to a first of a plurality of exemplary embodiments of the present invention. The use of "first embodiment," second "embodiment," etc. are not to be interpreted as an exhaustive list of enumerated variations, merely an annotated list of exemplary embodiments for use in illustrating the scope of the invention. The copier includes a printing unit 100, a feeding unit 200 arranged below the printing unit 100, a scanning unit 300 arranged above the printing unit 100, and an auto document feeder 400 arranged above the scanning unit 300. The auto document feeder 400 includes a document board 401 to hold a document and to send the document to the scanning unit 300. The copier further includes a manual feeding tray 70 arranged on right side of the printing unit 100, and an ejecting tray 90 arranged on a side of the printing unit 100.

In the exemplary embodiment, the scanning unit 300 includes a contacting glass 301, a first running member 302 including a light source, a second running member 303 including a mirror, an imaging lens 304, and a scanning sensor 305. The contacting glass 301 holds the document sent from the document board 401 or placed manually by a user. The first running member 302 is actuated while lighting the document on the contacting glass 301 based on operating a starting switch (not illustrated). The second running member 303 is actuated while reflecting the light reflected by the document to the scanning sensor 305 through the imaging lens 304. The scanning sensor 305 scans an imaging information based on the light reflected by the second running member 303 and outputs the scanned imaging information to a controller (not illustrated).

In the exemplary embodiment, the feeding unit 200 includes a recording medium bank 201 including plurality of feeding cassettes 202 to hold plural recording medium P, and plural pair of conveying rollers 206 composing a conveying path. Each feeding cassette 202 includes a feeding roller 203 and a separating roller 204. The feeding roller 203 sequentially pulls out the top recording medium P in the feeding cassette 202, and the separating roller 204 separates the top recording medium P from others and feeds the separated recording medium P to the conveying path. The pair of conveying rollers 206 feeds the recording medium P fed from the feeding cassette 202 to next pair of conveying rollers 206 or the printing unit 100.

In the exemplary embodiment, the manual feeding tray 70 includes a feeding roller 71 to operate similarly to the feeding roller 203, and the separating roller 72 to operate similarly to the separating roller 204.

In the exemplary embodiment, the printing unit 100 includes an exposure device 10, a image forming device 20 of tandem type, an intermediate transfer device 30 as a belt driving device, and a second transfer device 40, a fixing device 50, a feeding path 60, and an ejecting rollers 80. The intermediate transfer device 30 and the second transfer device 40 are also referred to as a "driving device" 500.

In the exemplary embodiment, the image forming device 20 includes image forming members 22Bk, 22Y, 22M, 22C arranged in a line horizontally, which holds respective color toners of black, yellow, magenta, cyanogen. The image forming members 22Bk, 22Y, 22M, 22C each are supported rotatably, and are charged by a charging unit while rotating in anticlockwise direction, for example. Then a controller (not shown) controls the exposure device 10 to exposure a laser L to each image forming member 22Bk, 22Y, 22M, 22C based on a color of the scanned imaging information, thereby the image forming members 22Bk, 22Y, 22M, 22C each form static potential images. Next a developing unit makes the static potential images into visible images as toner images on the image forming members 22Bk, 22Y, 22M, 22C.

In the exemplary embodiment, the intermediate transfer device 30 includes an intermediate transfer belt 31 is facing relation with the image forming device 20 horizontally, driven rollers 32, 33, 35, a driving roller 34 to rotate the intermediate transfer belt 31 in clockwise direction, for example, and a belt cleaning member 37. Three rollers 32, 33, 34 are arranged inside a loop of the intermediate transfer belt 31 to tense the intermediate transfer belt 31. The intermediate transfer device 30 further includes transfer rollers 36Bk, 36Y, 36M, 36C to contact an inner surface of the intermediate transfer belt 31 and to be arranged opposite the image forming members 22Bk, 22Y, 22M, 22C. An electric field of the transfer rollers 36Bk, 36Y, 36M, 36C and the image forming members 22Bk, 22Y, 22M, 22C cooperate to transfer electrostatic images to the recording medium.

According to the structure described above, the toner images on the image forming members 22Bk etc. are transferred onto the intermediate transfer belt 31 by the electric field and pressure between the image forming members 22Bk etc. and the transfer rollers 36Bk etc. while sequentially overlapping to superimpose the images onto the medium. Thereby the overlapped toner images with four-color are formed on the intermediate transfer belt 31. After transferring the toner images, a discharge lamp initializes an electric potential on the image forming members 22Bk etc., and then cleaning units remove residual toner from the image forming members 22Bk etc.

In the exemplary embodiment, the feeding path 60 includes a pair of resist rollers 61 to nip the recording medium P fed from the feeding unit 200 or the manual feeding tray 70. The pair of resist rollers 61 sends the recording medium P between the intermediate transfer belt 31 and the second transfer device 40 as the position of the recording medium P coincides with the position of the toner images between the intermediate transfer belt 31 and the second transfer device 40.

The second transfer device 40 includes a conveying belt 41 to convey the recording medium P, a driving roller 42, a driven roller 43 driving to rotate the conveying belt 41 in anticlockwise direction, for example, and a second transfer roller 510. The second transfer roller 510 is referred as an outside body or an outside roller to contact an outer surface of the intermediate transfer belt 31, and to be arranged adjacent and preferably opposite to the driving roller 510 across the intermediate transfer belt 31. Two rollers 42, 43 are arranged inside a loop of the conveying belt 41 to tense the conveying belt 41. The second transfer roller 510 transfers the toner images supported on a surface of the intermediate transfer belt 31 onto the sent recording medium P, and Residual toner on the intermediate transfer belt 31 is removed by the belt cleaning member 37. Then the conveying belt 41 conveys the recording medium P with toner images to the fixing device 50.

The fixing device 50 includes a heating roller 51 and a pressing roller 52. The heating roller 51 and the pressing roller 52 fix the toner images on the conveyed recording medium P by heat and pressure. Then ejecting roller 80 ejects the recording medium P with fixed toner images to the ejecting tray 90.

Figure 2:
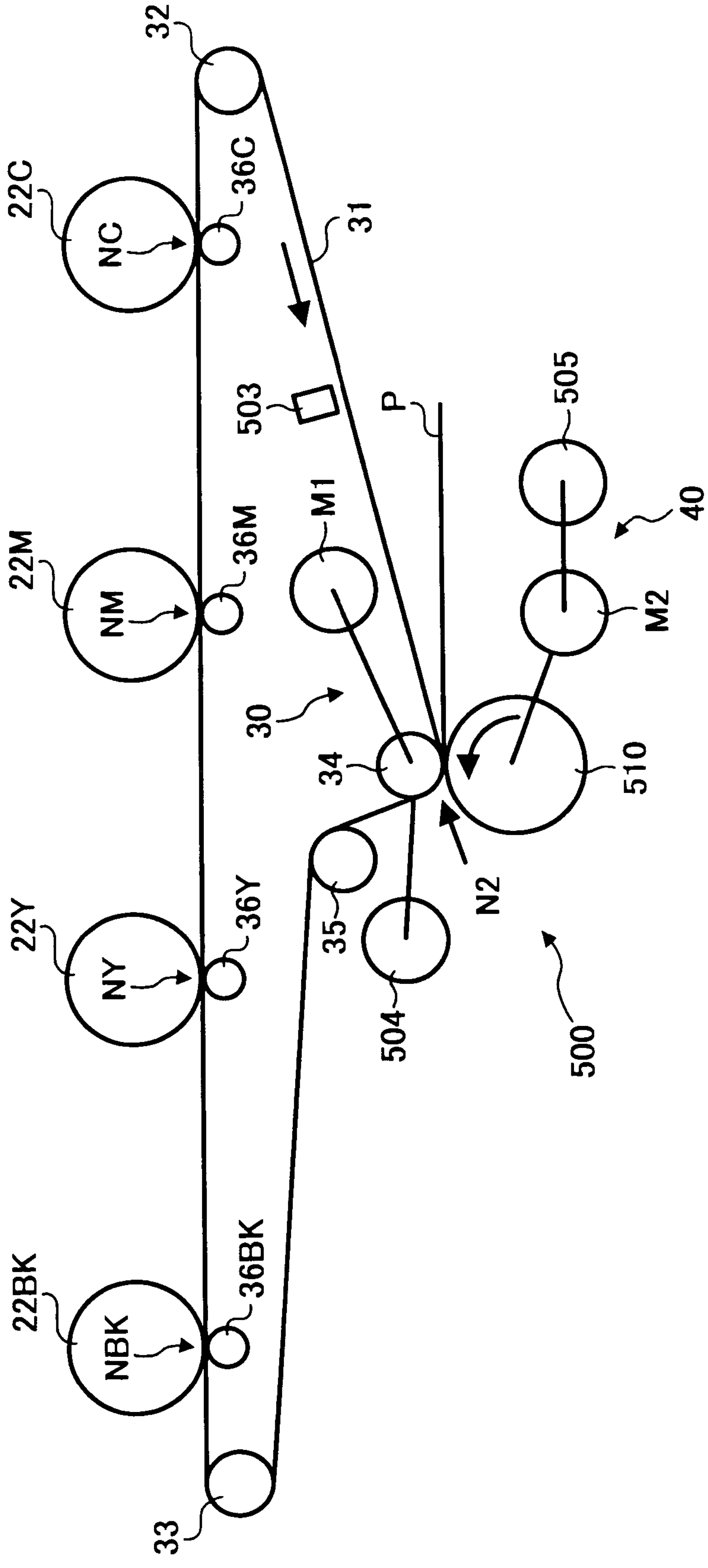
FIG. 2 is a schematic view showing a driving device according to the image forming apparatus of FIG. 1.
Figure 3:
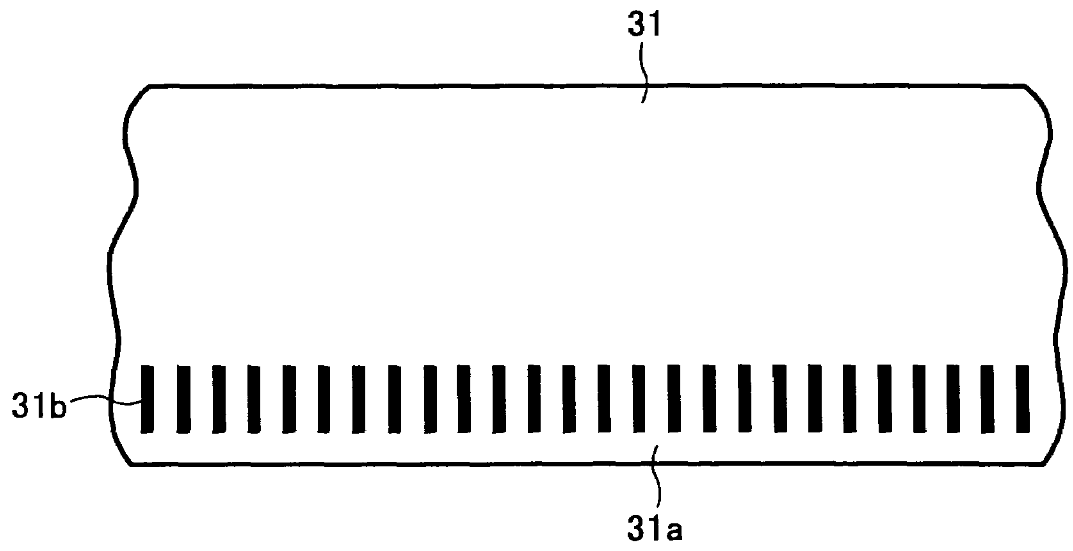
FIG. 3 is a schematic view showing an intermediate transfer belt according to the exemplary embodiment.

FIG. 2 is a schematic view showing a driving device 500 according to the first embodiment. FIG. 3 is a schematic view showing an intermediate transfer belt 31 according to the first embodiment. The intermediate transfer device 30 further includes a driven roller 34, a belt motor M1 configured to drive the driving roller 34 referred as a direct current motor, a linear encoder 503, and a viscous damper 504. The driven roller 35 is arranged outside the loop of the intermediate transfer belt 31 to tense the intermediate transfer belt 31. The viscous damper 504 is referred as a absorbing member to absorb shock applied to the driving roller 34.

The intermediate transfer belt 31 includes plural timing marks 31*b* on the end of the surface 31*a*. The linear encoder 503 detects a peripheral velocity of the intermediate transfer belt 31 by detecting the plural marks 31*b*. Further intermediate transfer nips NBk, NY, NM, NC are respectively formed between the intermediate transfer belt 31 and each image forming members 22Bk, 22Y, 22M, 22C, where the toner images on the image forming members 22Bk etc. are transferred onto the intermediate transfer belt 31.

The second transfer device 40 further includes a transfer motor M2 configured to drive the second transfer roller 510 referred as a direct current motor, and a rotation encoder 505 detecting a rotation angular frequency of the transfer motor M2. Further a second transfer nip N2 is formed between the intermediate transfer belt 31 and the second transfer roller 510, where the intermediate transfer belt 31 contacts the second transfer roller 510. The second transfer roller 510 arises electric field in the second transfer nip N2 by bias impressed. The toner images on the intermediate transfer belt 31 are transferred onto the recording medium P by the electric field and pressure in the second transfer nip N2.

In the exemplary embodiment, the driving roller 34 is arranged adjacent to where the second transfer roller 510 contacts the outer surface of the intermediate transfer belt 31. In this way, the driving roller 34 can drive the intermediate transfer belt 31 to more steadily and rapidly compensate peripheral velocity fluctuation of the intermediate transfer belt 31 caused by the second transfer roller 510. In addition the driving roller 34 can drive the intermediate transfer belt 31 to more steadily and rapidly compensate peripheral acceleration fluctuation of the intermediate transfer belt 31 caused by the second transfer roller 510. Further the driving roller 34 can drive the intermediate transfer belt 31 to more steadily and rapidly compensate peripheral velocity and acceleration fluctuation of the intermediate transfer belt 31 caused by the recording medium P approaching or getting out the second transfer nip N2.

According to advantages described above, the peripheral velocity and acceleration fluctuation of the intermediate transfer belt 31 is prevented from affecting the area where the toner images are transferred from, or to the intermediate transfer belt 31. Therefore the image forming apparatus can steadily transfer the toner images onto the recording medium P without color drift.

Figure 4A:
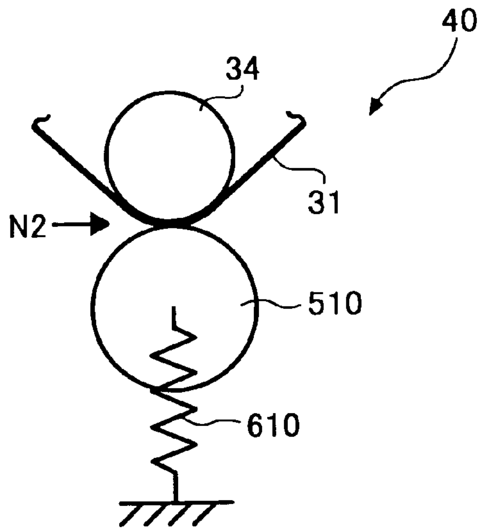
FIG. 4A is a schematic enlarged view showing a driving device according to the exemplary embodiment.

Referring now to FIG. 4A, a schematic enlarged view shows a portion of the driving device 500 according to the first embodiment. The second transfer device 40 further includes a spring 610 configured to press the second transfer roller 510 to the driving roller 34 across the intermediate transfer belt 31. Of course, those skilled in the art will recognize that the other tensioning devices are interchangeable with the spring shown in FIG. 4A. In the first embodiment, the intermediate transfer belt 31 may slip from the driving roller 34 caused by driving force of the second transfer roller 510 arranged adjacent to the driving roller 34 when the driving force of the driving 34 fluctuates caused by eccentricity or variation in diameter.

Figure 4B:
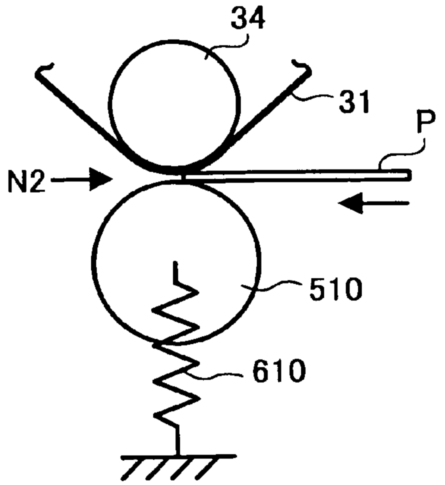
FIG. 4B is a schematic enlarged view showing a recording medium approaching a second transfer nip in FIG. 4A.

FIG. 4B illustrates a schematic enlarged view showing a situation that the recording medium P approaches the second transfer nip N2 in FIG. 4A. The driving force of the driving 34 may fluctuate caused by the recording medium P approaching the second transfer nip N2.

Figure 4C:
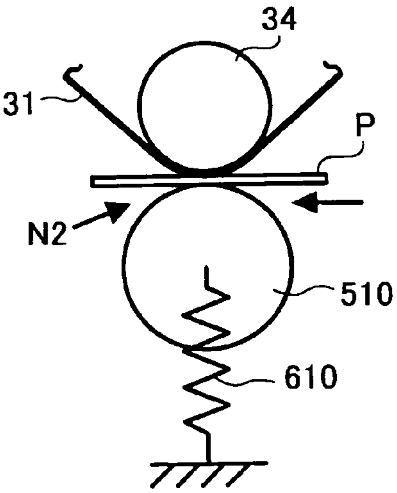
FIG. 4C is a schematic enlarged view showing a recording medium passing in the second transfer nip in FIG. 4A.

Likewise, FIG. 4C illustrates a schematic enlarged view showing a situation that the recording medium P passes in the second transfer nip N2 in FIG. 4A. The driving force of the driving 34 may fluctuate caused by the intermediate transfer belt 31 may slip from the driving roller 34 caused by driving force of the recording medium P passing in the second transfer nip N2.

Figure 5:
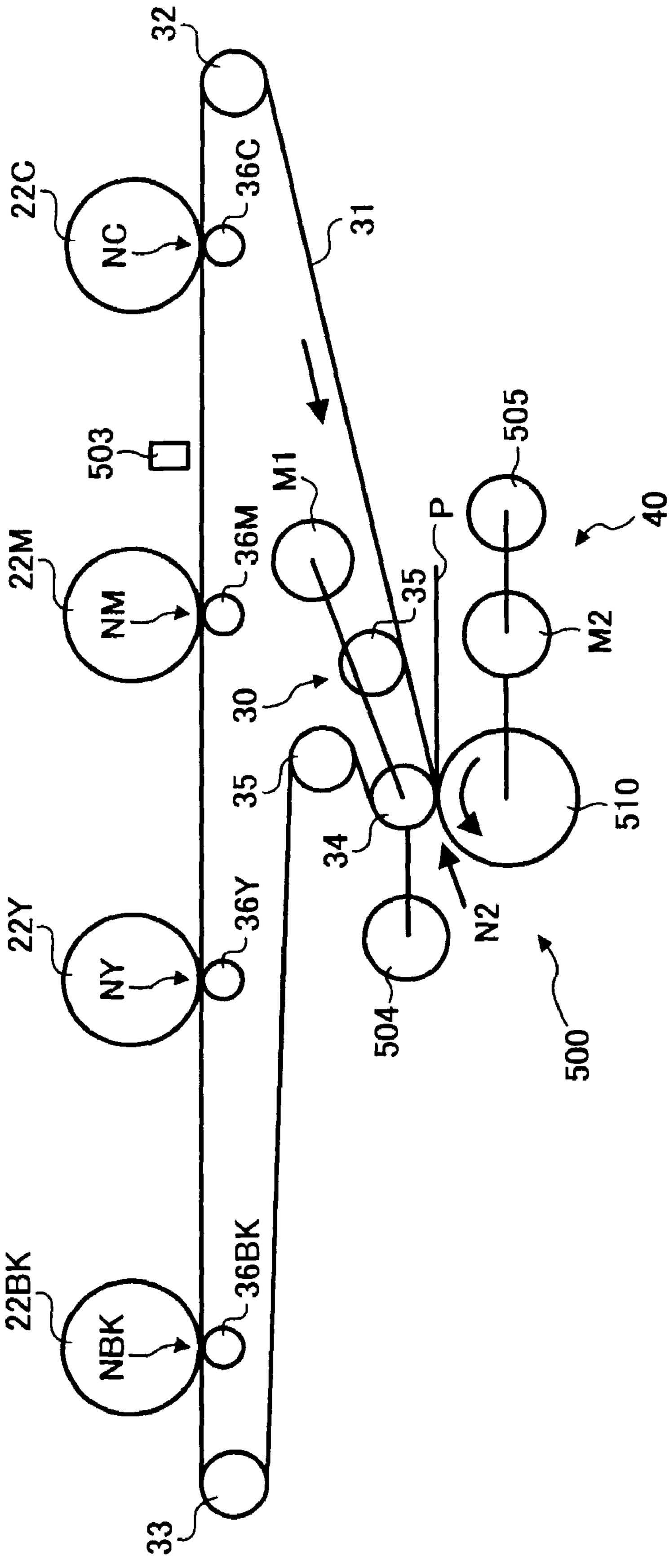
FIG. 5 is a schematic view showing a driving device according to a second embodiment of the present invention.

A schematic view showing a portion of the driving device 500 according to a second embodiment of the present invention is shown in FIG. 5. In the second embodiment, the intermediate transfer belt 31 wraps around the driving roller 34 so that an upstream portion is parallel to a downstream in a direction of rotation of the intermediate transfer belt 31. In this way, the intermediate transfer belt 31 is prevented from slipping around the driving roller 34. Therefore the driving roller 34 can steadily drive the intermediate transfer belt 31.

Figure 6A:
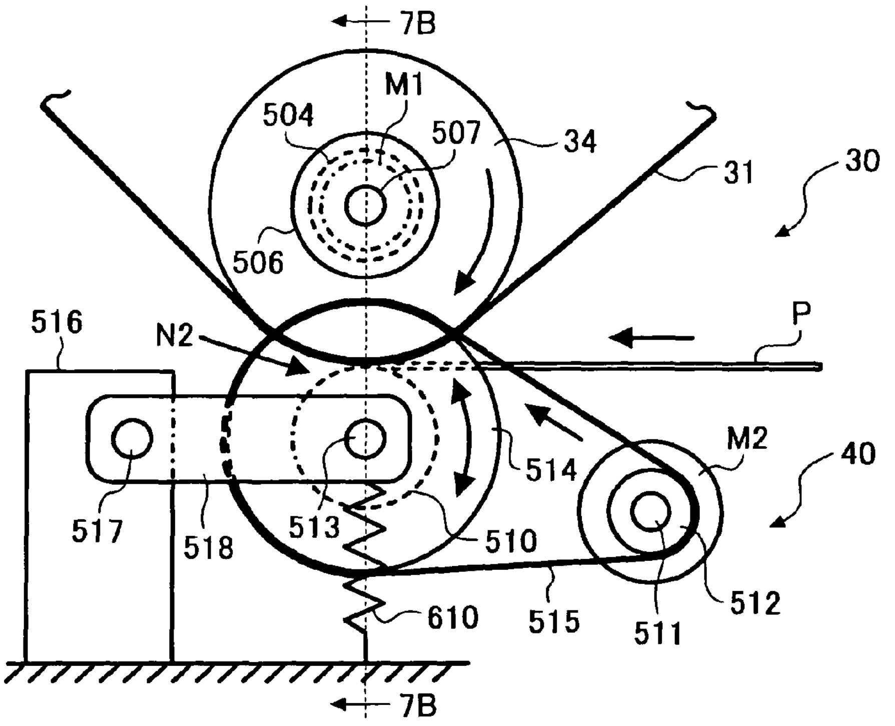
FIG. 6A is a schematic view showing a driving device according to a third embodiment of the present invention.
Figure 6B:
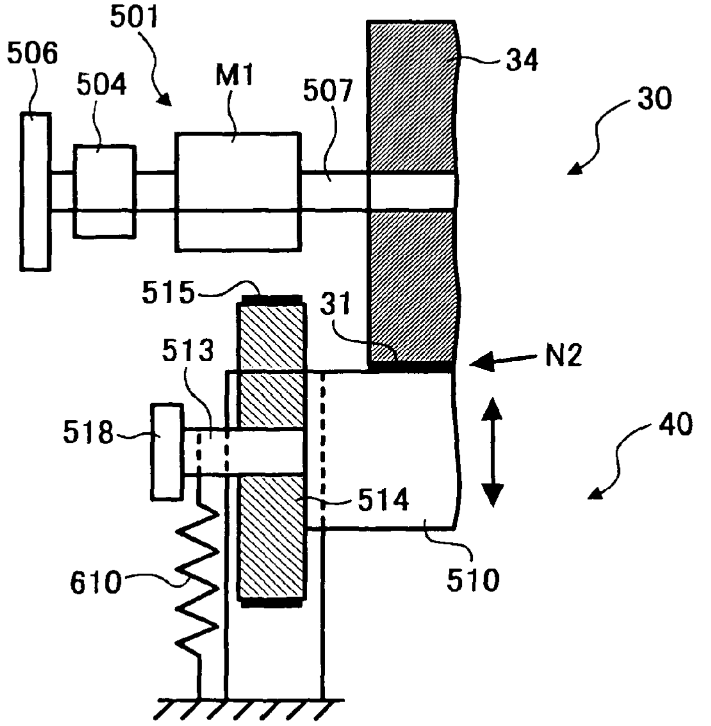
FIG. 6B is a side-sectional view taken along line 7B of FIG. 6A.

Referring now to FIG. 6A a schematic view showing a portion of the driving device 500 according to a third embodiment of the present invention is illustrated; FIG. 6B is a side-sectional view taken along line 7B of FIG. 6A. In the third embodiment, the following is added to each embodiment described above. The intermediate transfer device 30 further includes a flywheel 506, and a driving shaft 507 to link up the viscous damper 504 and the flywheel 506 to the belt motor M1. The flywheel 506 is also referred as an "absorbing member" to absorb shock applied the driving roller 34. The second transfer device 40 includes a pulley 512, a driving shaft 511 to link up the pulley 512 to the transfer motor M2, a pulley 514 with the second transfer roller 510, a driving belt 515 wrapped around the pulley 512 and the pulley 514. The second transfer device 40 moreover includes a base 516, a shaft 517 fixed to the base 516, an arm 518, and a supporting shaft 513. One end of the arm 518 is held to the shaft 517, and another end of the arm 518 is rotatably secured to supporting shaft 513. The supporting shaft 513 connects the another end of the arm 518 to the second transfer roller 510 and latches one end of the spring 610. According to this structure, the rotation of the belt motor M1 transmits to the intermediate transfer belt 31, and the rotation of the transfer motor M2 transmits to the second transfer roller 510.

Figure 7:
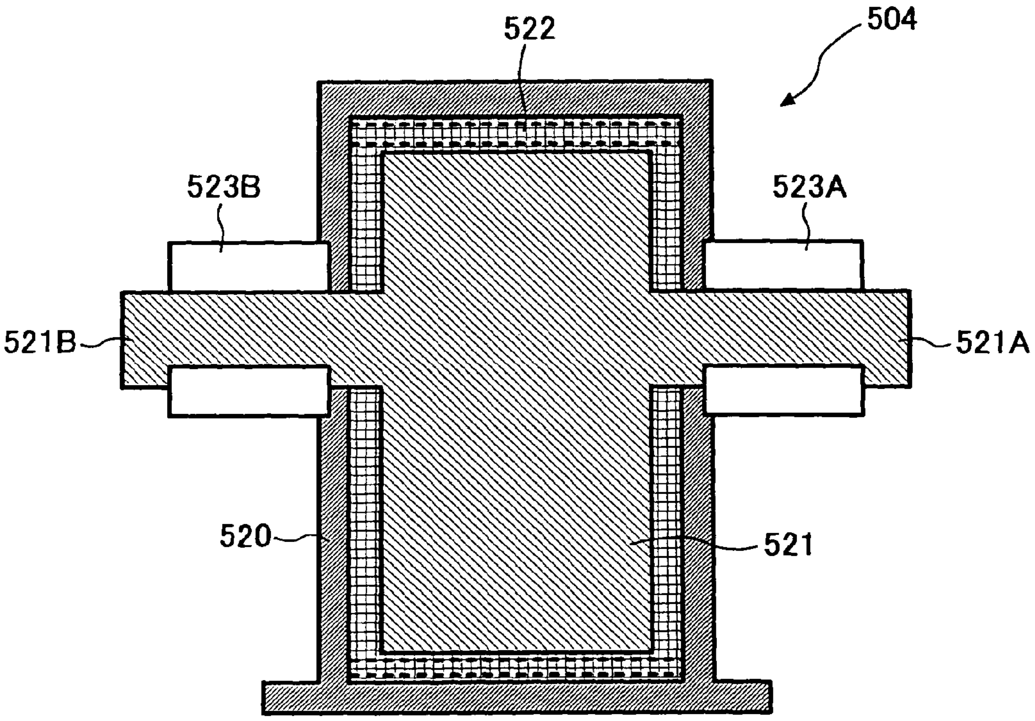
FIG. 7 is an enlarged sectional view showing a viscous damper according to the third embodiment.

FIG. 7 is an enlarged sectional view showing the viscous damper 504 according to the third embodiment. The viscous damper 504 includes a rotor 521, oil 522, for example, serving as a viscous fluid, a casing 520 to contain the rotor 521 and the oil 522. The rotor 521 includes a shaft portion 521A linked up to the belt motor M1, a shaft portion 521B linked up to the flywheel 506. The casing 5 includes bearings 523A, 523B to rotatably support the shaft portions 523A, 523B respectively and to seal the oil 522 in the casing 520. Thereby the rotor 521 can rotate in the oil 522. The viscous damper 504 may include instead of the oil 522 magnetism fluid or an electric generator as viscous load.

According to the third embodiment, the driving force of the driving roller 34 is prevented from fluctuating, especially high-frequency fluctuating because the viscous damper 504 and the flywheel 506 absorb shock applied to driving roller 34. Thereby the intermediate transfer belt 31 is prevented from slipping from the driving roller 34. Therefore the driving roller 34 can steadily drive the intermediate transfer belt 31. Meanwhile, one of the viscous damper 504 or the flywheel 506 may not be operably linked with the driving roller 34. The driving roller 34 with only the viscous damper 504 can rapidly respond to change a driving velocity. Alternatively, the viscous damper 504 and the flywheel 506 referred as the absorbing member may be arranged so to absorb the shock applied to the second transfer roller 510.

Figure 8:
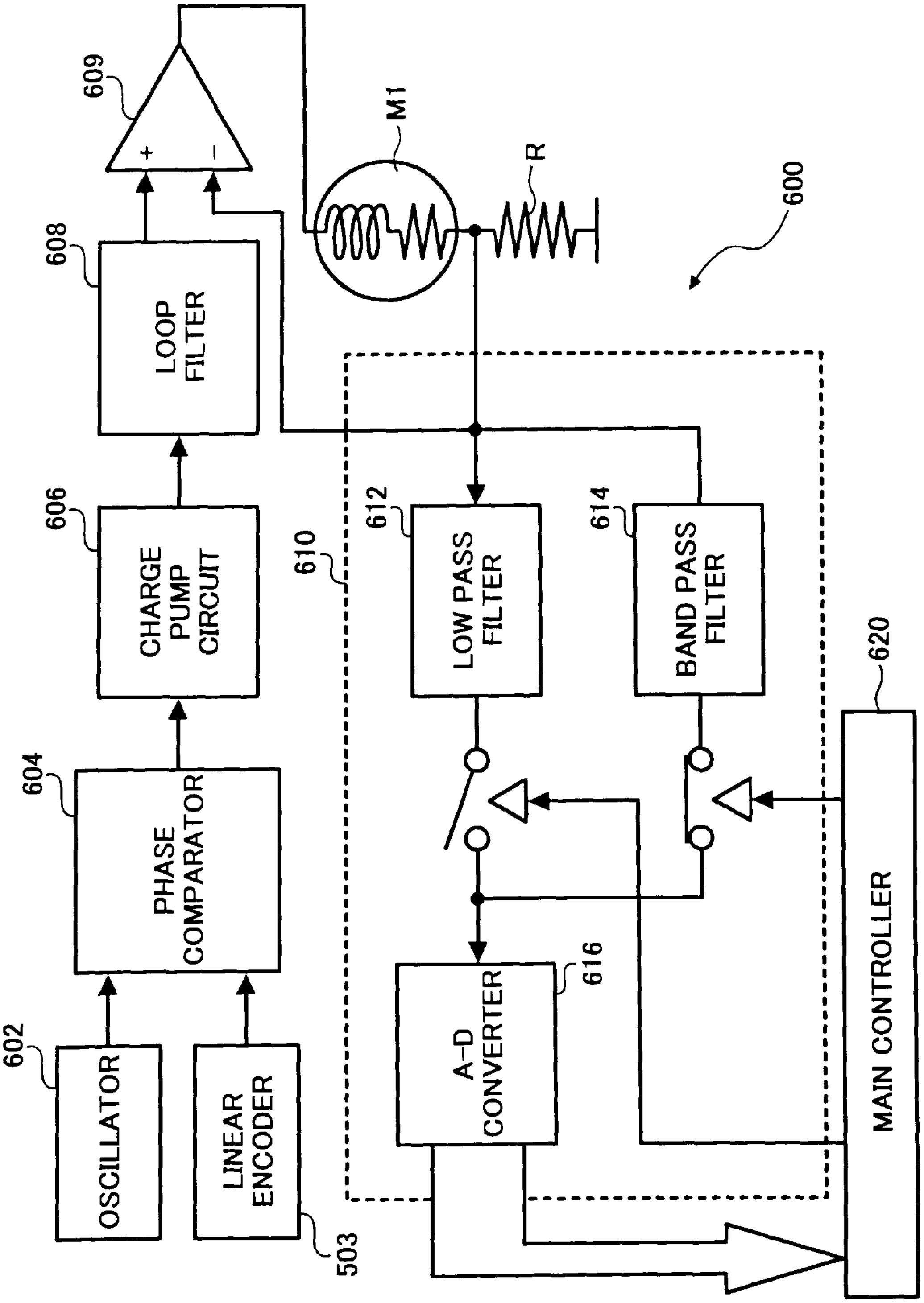
FIG. 8 is a block diagram of a belt control circuit according to a fourth embodiment of the present invention.

FIG. 8 is a block diagram of a belt control circuit 600 according to a fourth embodiment of the present invention. The belt control circuit 600 forming PLL (Phase Locked Loop) includes the linear encoder 503, an oscillator 602, a phase comparator 604, a charge pump circuit 606, a loop filter 608 to stabilize control system, a comparator 609, a servo amplifier 610, and a main controller 620. The servo amplifier 610 includes a low pass filter 612, a band pass filter 614, and a A-D converter 616. The oscillator 602 outputs basic pulses corresponding to a target velocity of the intermediate transfer belt 31. The linear encoder 503 outputs pulses corresponding to the detected velocity of the intermediate transfer belt 31. The phase comparator 604 compares a phase of the pulses outputted from the linear encoder 503 with a phase of the basic pulses. The charge pump circuit 606 supplies voltage in proportion to a phase difference outputted from the charge pump circuit 606 to the belt motor M1 through the loop filter 608 and the comparator 609. The servo amplifier 610 detects a current flowing in the belt motor M1 and inputs the detected current to the comparator 609. Thereby the belt control circuit 600 controls the velocity of the intermediate transfer belt 31 so to corresponding to the target velocity.

The servo 610 further detects a direct current in the current flowing in the belt motor M1 by the low pass filter 612 and inputs the detected direct current to the main controller 620 through the A-D converter 61 based on a signal from the main controller 620. In addition, the servo 610 detects an alternate current in the current flowing in the belt motor M1 by the band pass filter 614 and inputs the detected alternate current to the main controller 620 through the A-D converter 61 based on a signal from the main controller 620.

The belt control circuit 600 further controls the belt motor M1 to increase torque of the belt motor M1 when a recording medium P approaches or passes through the second transfer nip N2. The belt control circuit 600 calculates the torque to increase based on size or thickness of the recording medium P. Thereby the driving force of the driving 34 is prevented from fluctuating because the increasing torque relieves the shock applied to the driving roller 34. Thereby the intermediate transfer belt 31 is prevented from slipping from the driving roller 34 caused by the driving force of the second transfer roller 510.

Figure 9:
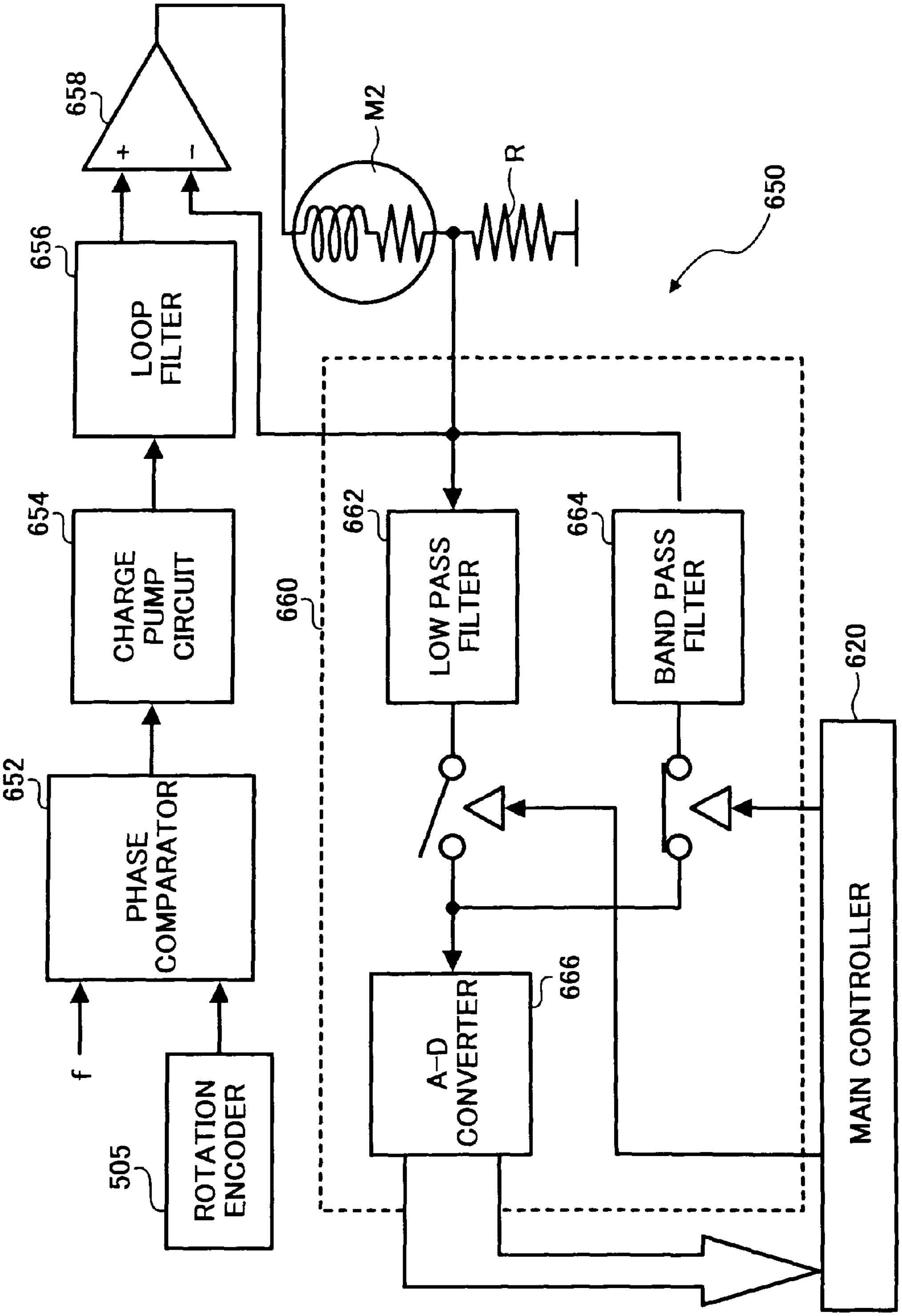
FIG. 9 is a block diagram of a roller control circuit according to the fourth embodiment.

FIG. 9 is a block diagram of a roller control circuit 650 according to the fourth. The roller control circuit 650 forming PLL (Phase Locked Loop) includes the rotation encoder 505 operably linked to the supporting shaft 513, a phase comparator 652, a charge pump circuit 654, a loop filter 656 to stabilize control system, a comparator 658, a servo amplifier 660, and a main controller 620. The servo amplifier 660 includes a low pass filter 662, a band pass filter 664, and a A-D converter 666. The rotation encoder 505 outputs pulses corresponding to the detected rotation angular frequency of the transfer motor M2. The phase comparator 660 compares phase of the pulses outputted from the rotation encoder 505 with a phase of a clock f corresponding to a target rotation angular frequency of the second transfer roller 510. The charge pump circuit 654 supplies voltage in proportion to a phase difference outputted from the charge pump circuit 654 to the transfer motor M2 through the loop filter 656 and the comparator 658. The servo amplifier 660 detects a current flowing in the transfer motor M2 and inputs the detected current to the comparator 658. Thereby the roller control circuit 650 controls the rotation angular frequency of the second transfer roller 510 so to corresponding to the target rotation angular frequency.

Further the servo amplifier 660 detects a direct current in the current flowing in the transfer motor M2 by the low pass filter 662 and inputs the detected direct current to the main controller 620 through the A-D converter 666 based on a signal from the main controller 620. In addition, the servo 660 detects an alternating current in the current flowing in the transfer motor M2 by the band pass filter 664 and inputs the detected alternating current to the main controller 620 through the A-D converter 666 based on a signal from the main controller 620.

The transfer control circuit 650 controls the transfer motor M2 so to increase torque of the transfer motor M2 when a recording medium P approaches or passes through the second transfer nip N2. The transfer control circuit 650 calculates the torque to increase based on size and/or thickness of the recording medium P. Thereby the driving force of the second transfer roller 510 is prevented from fluctuating because the increasing torque relieves the shock applied to the second transfer roller 510. Thereby the intermediate transfer belt 31 is prevented from slipping from the driving roller 34 caused by the driving force of the second transfer roller 510.

Further the transfer control circuit 650 controls the transfer motor M2 by a smaller loop gain than a loop gain by which the belt control circuit 600 controls the belt motor M1. Thereby the second transfer roller 510 driven by the transfer motor M2 is less responsive with respect to current change to the intermediate transfer belt 31 driven by the belt motor M1. Therefore the intermediate transfer belt 31 is prevented from slipping from the driving roller 34 caused by driving force of the second transfer roller 510.

Figure 10:
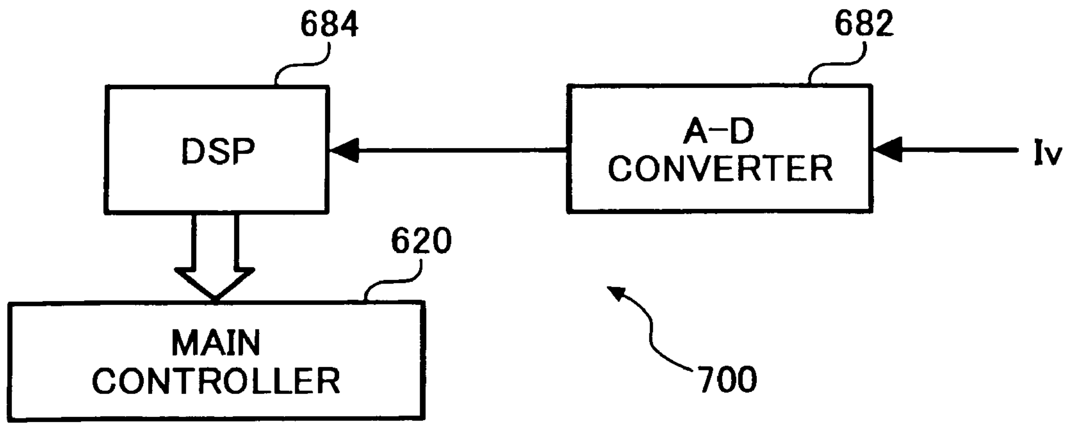
FIG. 10 is a block diagram of a detector for detecting driving load of a driving roller according to the fourth embodiment.

FIG. 10 is a block diagram of a detecting means 680 for detecting driving load of the driving roller 34 according to the fourth embodiment. The detecting means includes a A-D converter 682 configured to convert a flowing current as the driving load in belt motor M1 to digital value, and a DSP 684 configured to filter the digital value outputted from the A-D converter 682. The DSP 684 includes a function of a low pass filter, thereby filters a direct current in the current flowing in the belt motor M1. The DSP 684 further includes a function of a band pass filter, thereby filters an alternate current in the current flowing in the belt motor M1. The main controller 620 detects the direct and alternating current in the belt motor M1 by a signal outputted from the DSP 684. The variation of the detected direct current corresponds to the variation of the driving force by the second transfer roller 510 in the nip N2 based on the variation in diameter of the second transfer roller 510. The detected alternating current corresponds to the fluctuation of the driving force by the second transfer roller 510 in the nip N2 based on the eccentricity of the second transfer roller 510. Now the servo amplifier 610 in FIG. 8 may form the detecting means 680. Further the servo amplifier 660 in FIG. 9 may form the detecting means 680 because the driving load in belt motor M1 appears as a flowing current in the transfer motor M2 by reaction force between the second transfer roller 510 and the intermediate transfer belt 31.

The transfer control circuit 650 described in FIG. 9 modulates the clock f based on the direct and alternating current respectively detected by the detecting means 680, so to compensate the variation of the detected direct current and the detected alternating current. Here the clock f is expressed as $f=(f0+\Delta f)\{1+A\sin(\omega 0\,t+\phi)\}$ as described below.

In particular the transfer control circuit 650 detects the direct current while changing the clock f between f0 and $f0+\Delta fmax$ (decided by the maximum variation in diameter of the second transfer roller 34). The transfer control circuit 650 stores a clock fcmin when an average of the detected direct current is the minimum. Then the transfer control circuit 650 controls the transfer motor M2 in accordance with the fcmin. Thereby the transfer control circuit 650 can control the peripheral velocity of the second transfer roller 510 to correspond to the peripheral velocity of the intermediate transfer belt 31 in the second transfer nip N2 in spite of the variation in diameter of the second transfer roller 510. Therefore the second transfer roller 510 hardly drives the intermediate transfer belt 31. Thereby the intermediate transfer belt 31 is prevented from slipping from the driving roller 34 caused by driving force of the second transfer roller 510.

Further the transfer control circuit 650 detects the alternate current while changing a phase $\phi$ and fixing an amplitude A to Amax as the maximum. The transfer control circuit 650 stores a phase $\phi$min when an average of the detected alternate current is the minimum. Then the transfer control circuit 650 detects the alternate current while changing the amplitude A and fixing the phase $\phi$min. The transfer control circuit 650 memorizes an amplitude Amin when an average of the detected alternate current is the minimum. Then the transfer control circuit 650 controls the transfer motor M2 with the phase $\phi$min and the amplitude Amin. Thereby the transfer control circuit 650 can control the peripheral velocity of the second transfer roller 510 to correspond to the peripheral velocity of the intermediate transfer belt 31 in the second transfer nip N2 in spite of the eccentricity of the second transfer roller 510. Therefore the second transfer roller 510 hardly drives the intermediate transfer belt 31. Thereby the intermediate transfer belt 31 is prevented from slipping from the driving roller 34 caused by driving force of the second transfer roller 510.

Further the transfer control circuit 650 preferably determines the clock f so to be different from resonant frequency of the viscous damper 504 and the flywheel 506 as the absorbing members. In other words, the resonant frequency of the absorbing member is different from periodic frequency of vibration caused by that the outside body contacts the outer surface of the intermediate transfer belt 31. Thereby the viscous damper 504 and the flywheel 506 are prevented from oscillating. In addition the transfer control circuit 650 preferably determines the clock f so to be different from the frequency of the basic pulses outputted from the oscillator 602 to control the intermediate transfer belt 31. Thereby the transfer control circuit 650 can easily detect the direct and alternating current in the belt motor M1.

The transfer control circuit 650 may control the transfer motor M2 with the clock fcmin, the phase $\phi$min, and the amplitude Amin. The transfer control circuit 650 may control the transfer motor M2 with the clock fcmin or both of the phase $\phi$min and the amplitude Amin according to which has a significant impact on the velocity difference, the variation in diameter or the eccentricity of the second transfer roller 510.

The following shows the mathematical rationale with regard to peripheral velocity of the second transfer roller 510 corresponding to the peripheral velocity of the intermediate transfer belt 31 in the second transfer nip N2 based on modulating the clock f by sine wave. The following expression is true with respect to the second transfer roller 510, a semidiameter is R, the eccentricity is $\epsilon$, the rotation angle is $\omega$, and the peripheral velocity in the second transfer nip N2 is V. Meanwhile $\alpha$ is chronotropic phase caused by the eccentricity of the second transfer roller 510.

$$V=\omega\{R+\epsilon V\sin(\omega t+\alpha)\}$$

$$\omega\approx V/R-(\epsilon V/R)V\sin(\omega t+\alpha)$$

$$\omega=\omega R+\Delta\omega(\omega R=V/R,\ \Delta\omega \text{ is variation of } \omega)$$

$$\Delta\omega\approx-(\epsilon v/R)V\sin(\omega Rt+\alpha)\ (\text{based on } \omega R>>\Delta\omega)$$

Thus the transfer control circuit 650 can control the transfer motor M2 so that the peripheral velocity of the second transfer roller 510 corresponds to the peripheral velocity of the intermediate transfer belt 31 in the second transfer nip N2 based on modulating the clock f by the $\Delta\omega$ as sine wave.

The transfer control circuit 650 may control the transfer motor M2 so that the peripheral velocity of the second transfer roller 510 is different from the peripheral velocity of the intermediate transfer belt 31 in the second transfer nip N2 to prevent from hollow characters on the recording medium P. In such case, $\Delta V$ is added to the V in the expression described above.

The following shows a mathematical rationale with regard to a clock generation circuit to generate and to change the clock f in FIG. 9.

When regarding the second transfer roller 510, an angular frequency is $\omega$ and a rotation cycle is T, $\omega T=2\pi$. When a basic clock frequency to decide an angular speed of the second transfer roller 510 is f0 and an increment clock frequency to change the angular speed of the second transfer roller 510 is $\Delta f$, $(fo+\Delta f)T=N$ (N: necessary number of pulses of the clock f for the second transfer roller 510 to rotate or arising number of pulses when the encoder 505 rotates once). A rotation angular speed is $2\pi(f0+\Delta f)/N$. In case of modulating the clock f by the sine wave with the rotation cycle of the second transfer roller 510, the angular frequency $\omega=\omega 0\{1+A\sin(\omega 0t+\phi)\}$ (A: the maximum amplitude of changing angular speed, $\phi$: a phase of changing angular speed). Thereby the clock $f=(f0+\Delta f)\{1+A\sin(\omega 0t+\phi)\}$ because the clock $f=(N/2\pi)\omega$. This pulse width $Pw=1/f=[1/(f0+\Delta f)]*[1/\{1+A\sin(\omega 0t+\phi)\}]$. $Pw=[1/[(f0+\Delta f)]*[1-A\sin(\omega 0t+\phi)]$ based on $1>>A$. The Pw is set so to be N pulses in $0\leqq t\leqq T$ $\{T=N/(f0+\Delta f)\}$. $\Delta Pw=Pw-$a pulse width of the basic frequency $Pw0=-\{A/(f0+\Delta f)\}V\sin(\omega 0t+\phi)$. To realize these theory by a delay circuit, the $\Delta Pw$ is modulated by a delay time $\tau$ from basic frequency $(f0+\Delta f)$. The $\Delta Pw$ also swings over to minus side on the basic of $(Pw0/2)$. Thereby the basic clock f to control the rotation of the second transfer roller 34 can arise after the delay time $\tau=(Pw0/2)+\Delta Pw$ from the basic frequency $(f0+\Delta f)$. When a value to count the Pw0 is Nc and a time interval to count the Pw0 is $\delta P$, $Pw0=Nc\cdot\delta P$. Thereby the following is prepared as a basic table of $\sin(\omega 0t)$.

$$\tau=(Pw0/2)-Pw0A\sin(\omega 0t+\phi)=\{Nc/2-NcA\sin(\omega 0t+\phi)\}\,\delta P.$$

When $tn=(T/N)*n=\{2\pi/(N\omega 0)\}*n$ (n=1,2, - - - N−1), $\sin(\omega 0tn)=\sin\{2\pi(n/N)\}$. Thereby a basic table of $\sin(\omega 0t)$ corresponding to n is prepared. The phase $\phi$ changes by changing where a reference point starts in the table. The amplitude A is multiplied.

Figure 11:
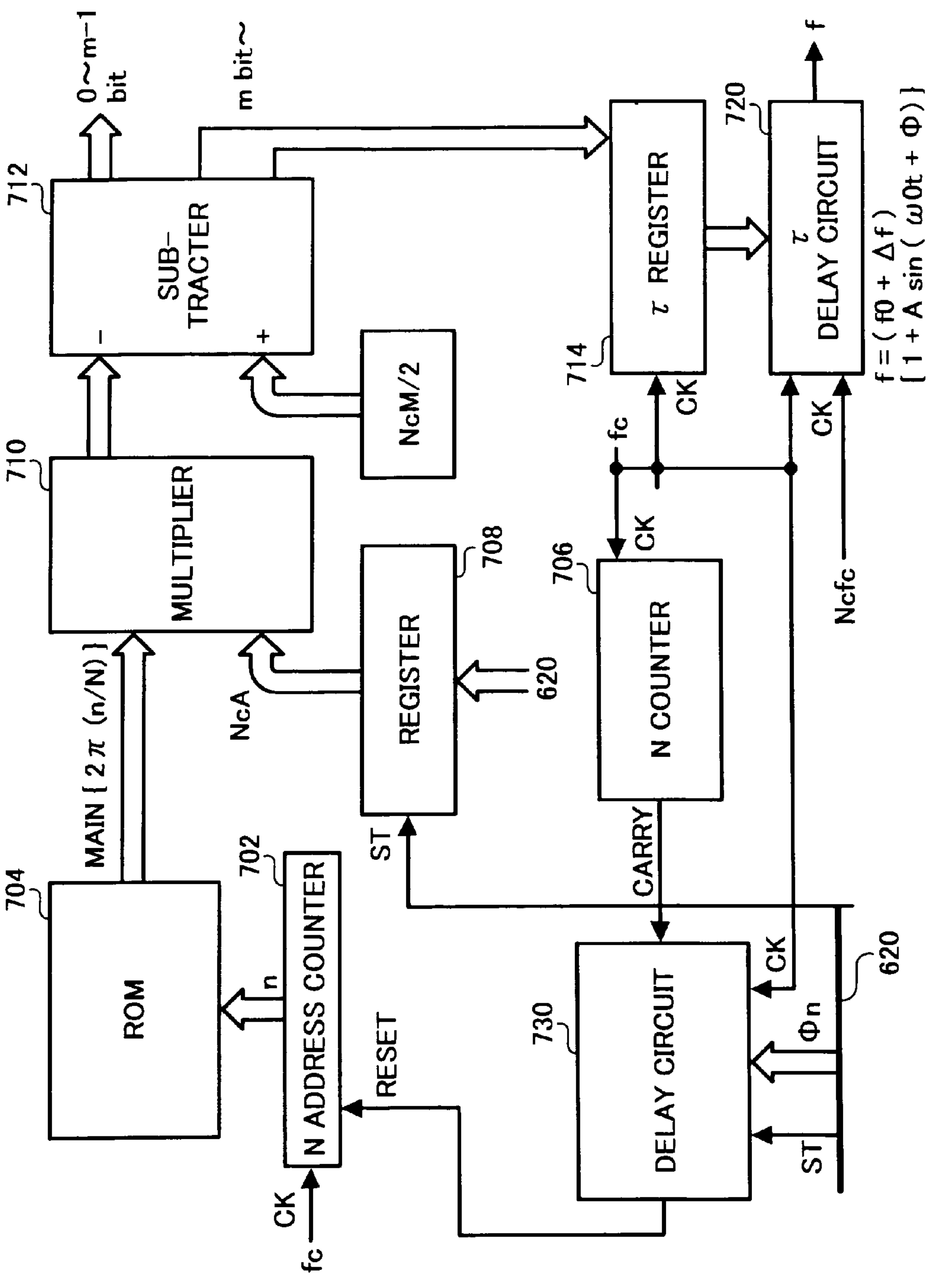
FIG. 11 is a block diagram of a clock generation circuit to generate and to change a basic clock f in FIG. 9 according to the fourth embodiment.
Figure 12:
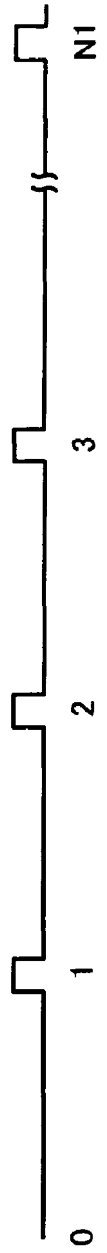
FIG. 12 is a time chart showing pulses output from the clock generation circuit.

FIG. 11 is a block diagram of a clock generation circuit 670 to generate and to change the basic clock f in FIG. 9 according to the fourth embodiment. FIG. 12 is a timing diagram showing pulses outputted from the clock generation circuit 670. To realize the theory described above, the clock generation circuit 670 includes a $\tau$ delay circuit 720, a delay circuit 730 configured to set a phase $\phi$, a N address counter 702, a ROM 704 configured to hold a table of $M\sin\{2\pi(n/N)\}$, a N counter 706 configured to arise a basic timing, a register 708 configured to set a gain NcA, a multiplier 710, a subtracter 712, and a τ register 714.

As described above, τ=(Pw0 /2)−Pw0A sin(ω0t+ϕ)=[{NcM/2−NcAM sin(ω0t+ϕ)}/M]δP. M is decided by $M=2^m$ (m is natural number) so to acquire necessary accuracy of A sin (ω0t+ϕ).

The main controller 620 decides A and outputs NcA to the register 708 to. Nc is decided so to acquire accuracy of NcA. The main controller 620 decides ϕ and outputs ϕn (n is integral number between 0 and N−1) to the delay circuit 730. The N counter 706 arises the basic timing by counting the clock fc N times after whole circuits becomes ON state. The delay circuit 730 outputs a reset signal to the N address counter 702 after counting the clock fc number of times corresponding to the ϕn after the basic timing. The N address counter 702 counts from 0 to N−1 by a clock fc. The ROM 704 outputs M sin {2π(n/N)} as a data of address n designated by the N counter 702. Thereby the ROM 704 can output M sin {2π(n/N)} after pluses corresponding to the ϕn after the basic timing. The τ register 714 receives a data based on M sin{2π(n/N)} through the multiplier 710 and the subtracter 712. The subtracter 712 does division with M by deleting low bits between 0 and m−1. The τ delay circuit 720 outputs the clock f delayed from the clock fc based on a signal outputted from the τ register 714.

Figure 13:
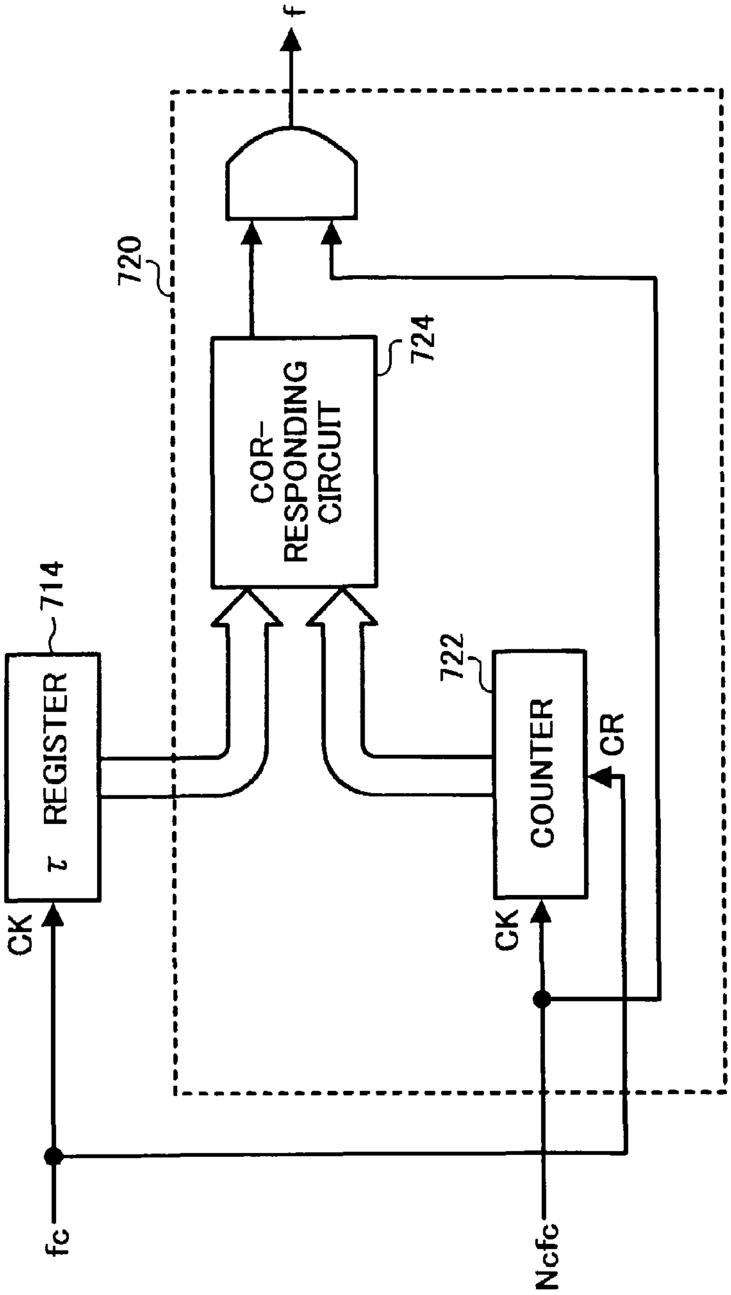
FIG. 13 is a block diagram of a $\tau$ register and a $\tau$ delay circuit in FIG. 11 according to the fourth embodiment.

FIG. 13 is a block diagram of the τ register 714 and the τ delay circuit 720 in FIG. 11 according to the fourth embodiment. The τ delay circuit 720 includes a counter 722 and a corresponding circuit 724. The τ register 714 synchronizes the data with the clock fc; at same time the counter 722 is reset. The counter 722 counts a clock Ncfc, and the τ delay circuit 720 outputs the clock Ncfc when the corresponding circuit 724 determines that a signal outputted from the counter 722 corresponds to a signal outputted from the τ register 714.

Figure 14:
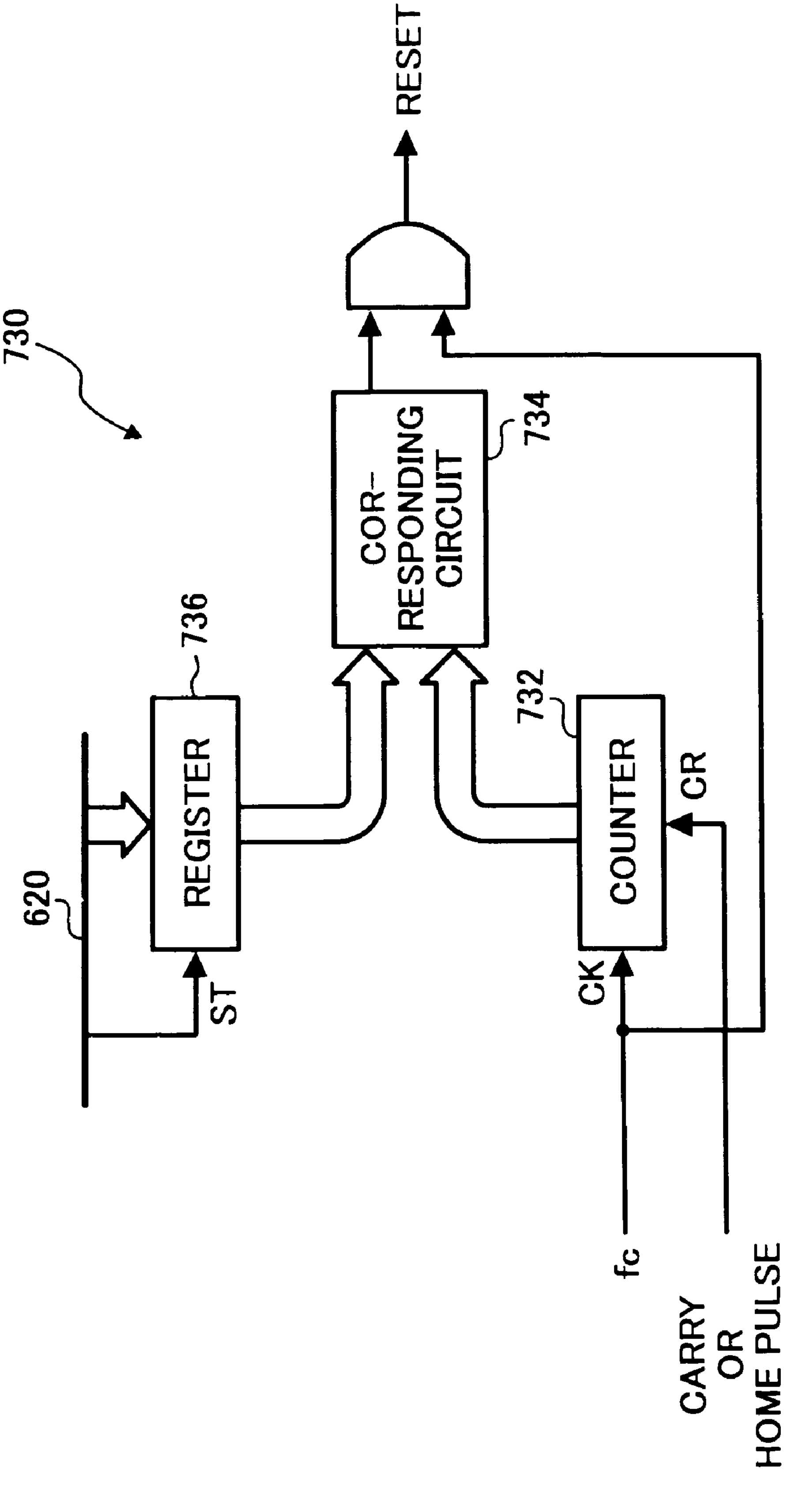
FIG. 14 is a block diagram of a delay circuit in FIG. 11 according to the fourth embodiment.

FIG. 14 is a block diagram of the delay circuit 730 in FIG. 11 according to the fourth embodiment. The delay circuit 730 includes a counter 732, a corresponding circuit 734, and a register 736. The register 736 sets one date ϕn between 0 and N−1 corresponding to the phase ϕ by the main controller 620. The counter 732 is reset by the basic timing outputted from the N counter 706. The delay circuit 730 outputs the reset signal when the corresponding circuit 734 determines that a signal outputted from the counter 732 corresponds to a signal outputted from the register 736. The counter 732 may be reset by a pulse showing a basic position of rotation angle that the encoder 505 outputs once per one rotation, for example. In such case, the most suitable ϕ and A are preferably held in a nonvolatile memory.

Figure 15:
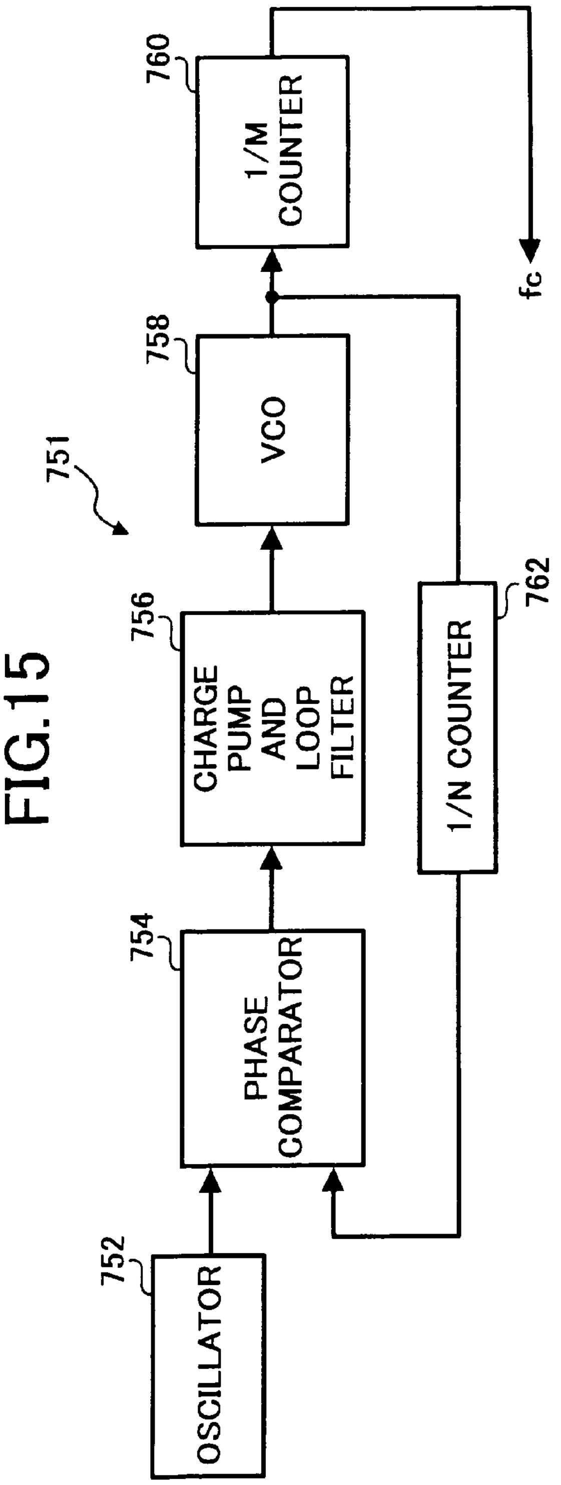
FIG. 15 is a block diagram of a clock generation circuit to generate a clock fc in FIG. 11 according to the fourth embodiment.

FIG. 15 is a block diagram of a clock generation circuit 751 to generate the clock fc in FIG. 11 according to the fourth embodiment. The clock generation circuit 751 forming PLL includes an oscillator 752 configured to provide a basic frequency f0, a phase comparator 754, a charge pump and a loop filter 756, a VCO 758, a 1/M counter 760, and a 1/N counter 762. Thereby a frequency N/M times (=(1+Δf/f0)=k) the basic frequency can be provided. Therefore the clock fc can be provided (fc=f0(1+Δf/f0)).

Figure 16:
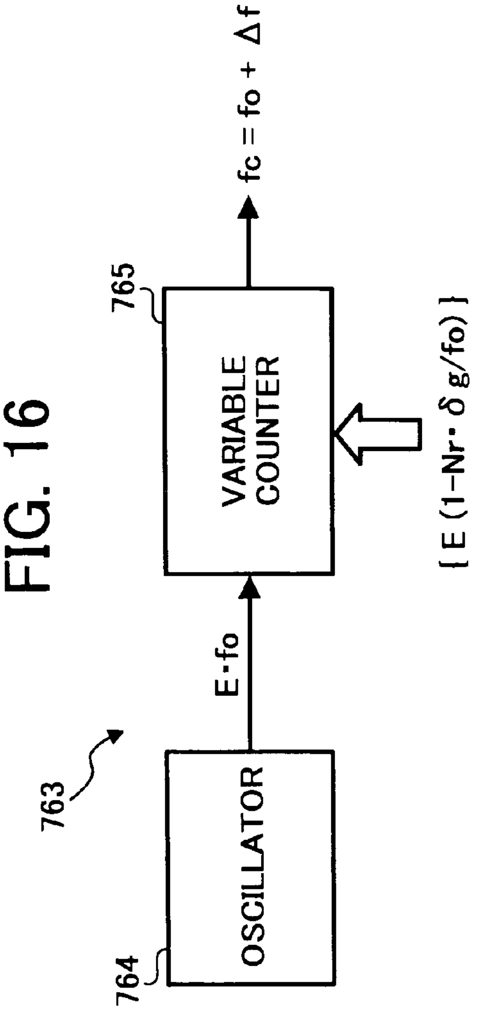
FIG. 16 is a block diagram of a counter circuit to generate the clock fc in FIG. 11 according to the fourth embodiment.

FIG. 16 is a block diagram of a counter circuit 763 to generate the clock fc in FIG. 11 according to the fourth embodiment. The counter circuit 763 includes an oscillator 764 and a variable counter 766. Thereby the fc=f0(1+Δf/f0) can be obtainable by only a counter circuit as demonstrated by the following relationship:

$$fc=f0(1+\Delta f/f0)$$

According to Δf/f0<<1, fc=f0/(1−Δf/f0)=(E·f0/{E(1−Δf/f0)}

When a resolving power of Δf is δg, Δf=Nr·δg (Nr: natural number)

$$fc=f0+\Delta f=(E\cdot f0)/\{E(1-Nr\cdot\delta g/f0)\}$$

E is a natural number so to obtain accuracy of (Eδg/f0) as a natural number. Thereby the fc can change based on changing the Nr.

Figure 17:
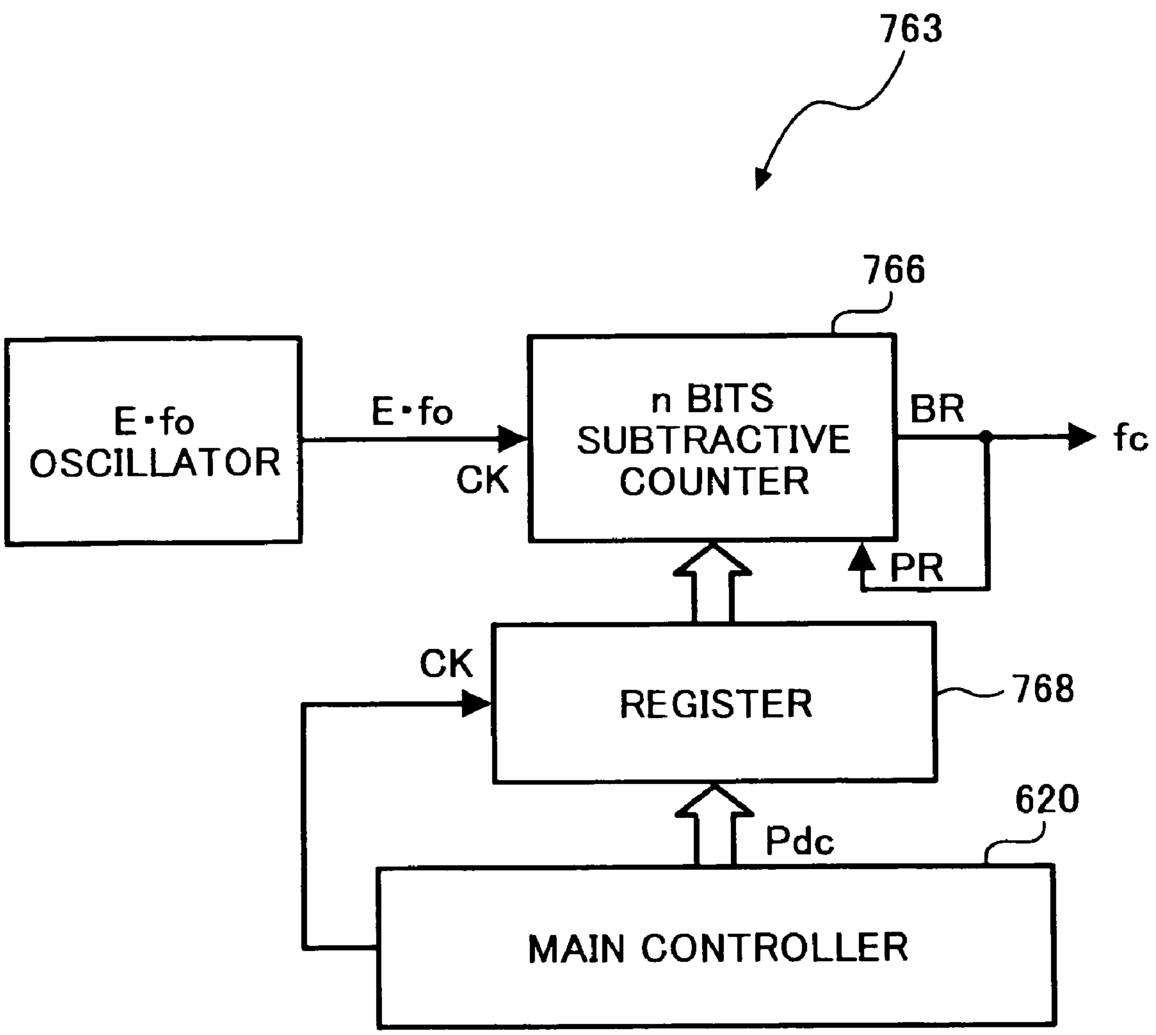
FIG. 17 is a detailed block diagram of the counter circuit according to the fourth embodiment.

FIG. 17 is a detailed block diagram of the counter circuit 763 according to the fourth embodiment. The counter circuit 763 includes the oscillator 764, a register 768 configured to designate a counting value, and a n bits subtractive counter 766. Pd is E (1−Nr·δg/f0). Pdmax is the maximum natural number of the Pd. The n corresponds to the minimum natural number forming $Pdmax<2^n$.

Figure 18:
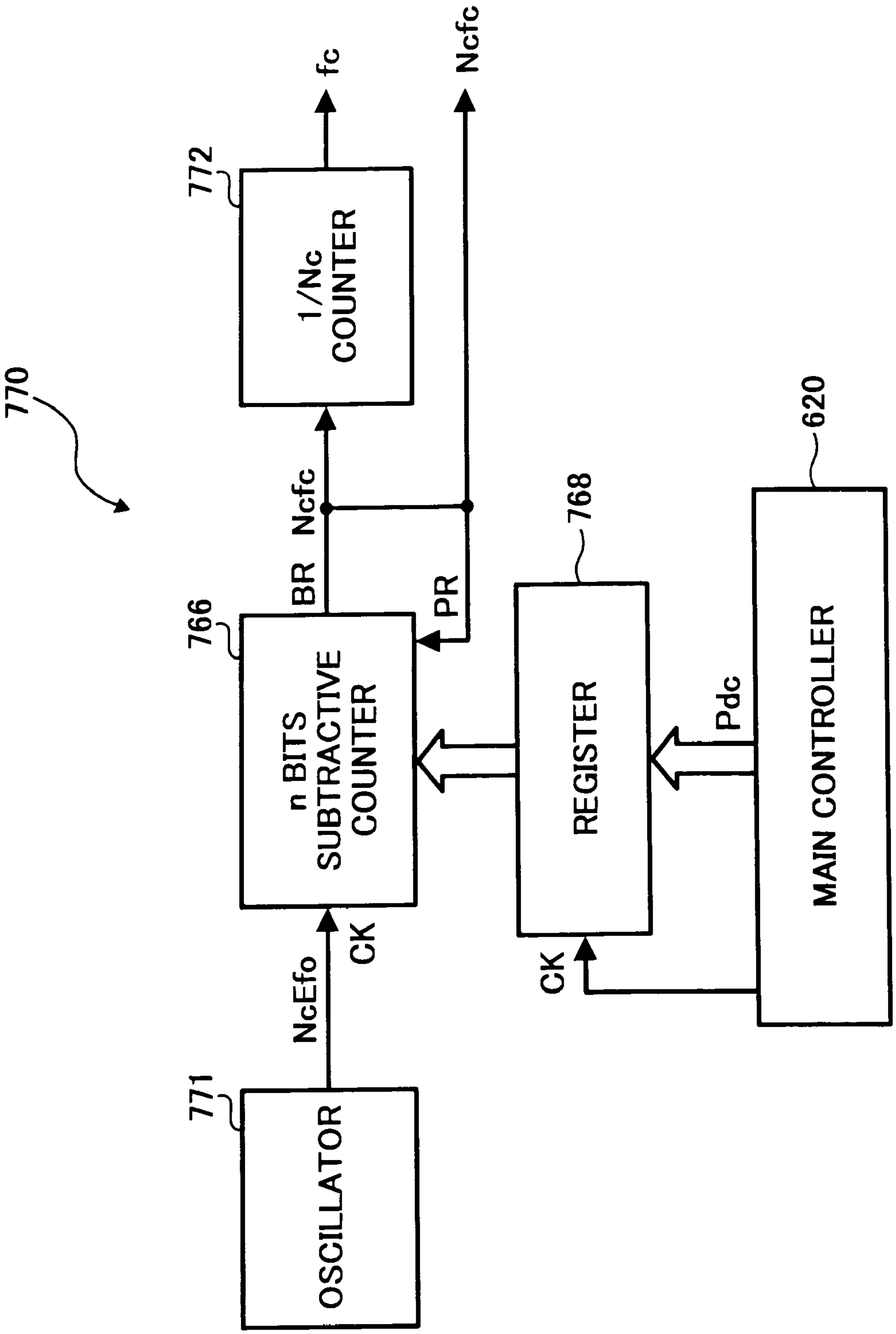
FIG. 18 is a block diagram of a counter circuit to generate the clock fc and a clock Ncfc in FIG. 11 according to the fourth embodiment.

FIG. 18 is a block diagram of a counter circuit 770 to generate the clock fc and the clock Ncfc in FIG. 11 according to the fourth embodiment. The counter circuit 770 includes an oscillator 771 instead of the oscillator 764 and further a 1/Nc counter 772. Thereby the following can be obtainable. Nc·fc=Nc(f0+Δf)=Nc(E·f0)/{E(1−Nr·δg/f0)}.

Figure 19:
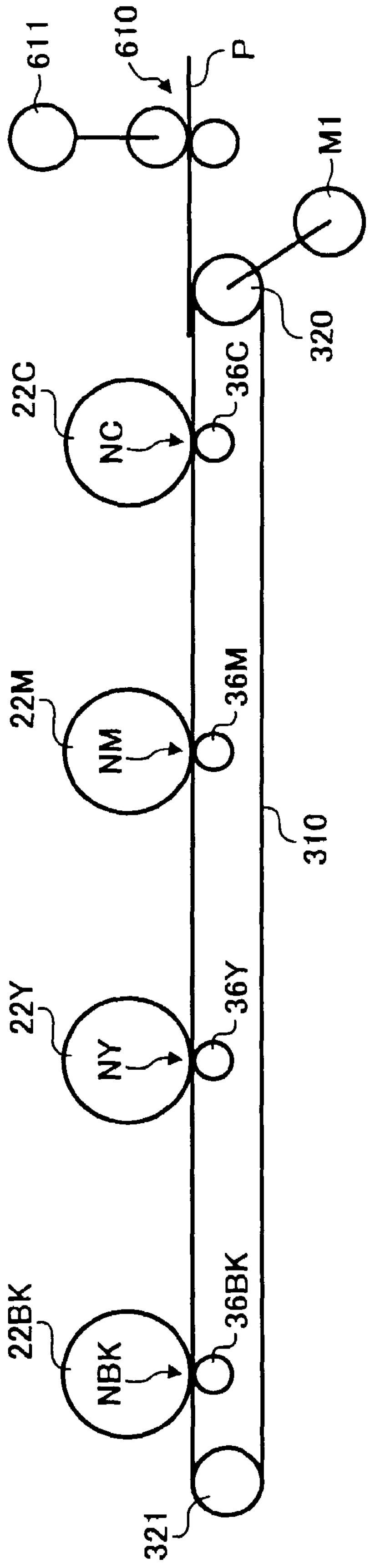
FIG. 19 is a schematic view showing a driving device and a feeding path according to a fifth embodiment.

FIG. 19 is a schematic view showing a portion of the driving device 500 and the feeding path 60 according to a fifth embodiment. The driving device 500 includes a conveying belt 310 configured to convey the recording medium P, a driven roller 321, a driving roller 320 configured to drive to rotate the conveying belt 310 in anticlockwise direction, for example, a pair of resist rollers 610, and a resist driving motor 611. The resist driving motor 611 drives the pair of resist rollers 610, which sends the recording medium P to an outer surface of the conveying belt 310. The pair of resist rollers 610 are arranged to nip back-end of the recording medium P when the recording medium P starts to be conveyed on the conveying belt 310. Two rollers 320, 321 are arranged inside a loop of the conveying belt 310 to tense the conveying belt 31. The driving roller 320 is driven by the belt motor M1 and arranged adjacent and preferably opposite to where the recording medium P as the outside body of the present invention starts to be conveyed on an outer surface of the conveying belt 310. Further the driving device 500 includes transfer rollers 36Bk, 36Y, 36M, 36C to contact an inner surface of the conveying belt 310 and to be arranged opposite the image forming members 22Bk, 22Y, 22M, 22C. The transfer rollers 36Bk, 36Y, 36M, 36C arise electric field between them and the image forming members 22Bk, 22Y, 22M, 22C by bias impressed.

According to the structure described above, the recording medium P sent from the pair of the resist rollers 610 starts to be conveyed on the outer surface of the conveying belt 310 while the back-end of the recording medium P is nipped by the pair of resist rollers 610. The toner images on the image forming members 22Bk etc. are transferred onto the recording medium P conveyed on the conveying belt 310 by the electric field and pressure between the image forming members 22Bk etc. and the transfer rollers 36Bk etc. while sequentially superimposing images from a respective transfer roller. Thereby the overlapped toner images with four-color are formed on the recording medium P.

In this embodiment, the driving roller 320 is arranged adjacent and preferably opposite to where the recording medium P starts to be conveyed on an outer surface of the conveying belt 310 while still driven by the pair of resist rollers 610. Thereby the driving roller 320 can drive the conveying belt 310 to more steadily compensate peripheral velocity fluctuation of the conveying belt 310 caused by the recording medium P still driven by the pair of resist rollers

610. In addition the driving roller 320 can drive the conveying belt 310 to more steadily compensate peripheral acceleration fluctuation of the conveying belt 310 caused by the recording medium P still driven by the pair of resist rollers 610.

Figure 20:
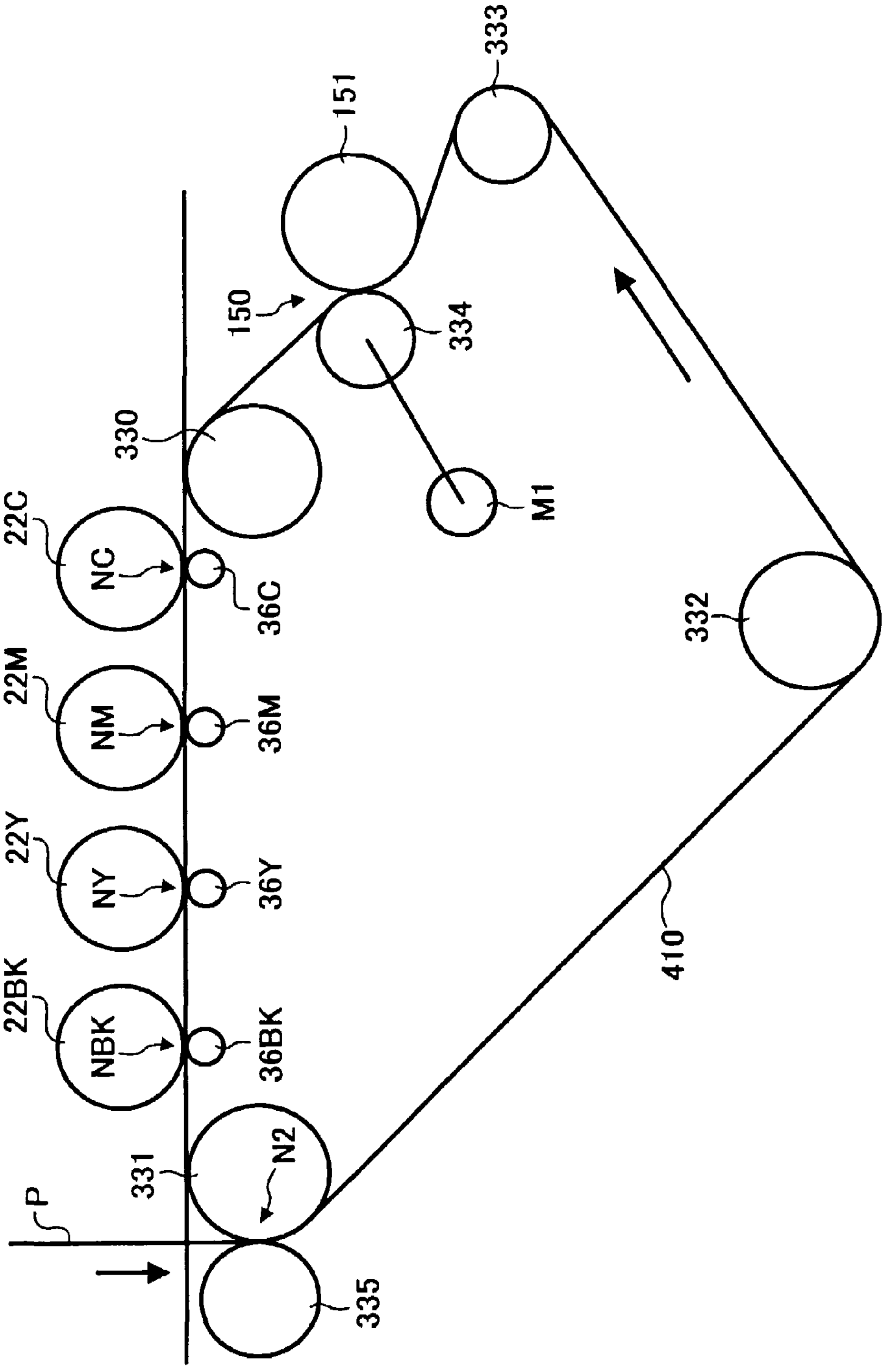
FIG. 20 is a schematic view showing a driving device according to a sixth embodiment.

FIG. 20 is a schematic view showing a portion of the driving device 500 according to a sixth embodiment. The driving device 500 includes an intermediate transfer belt 410, a driven roller 330, 331, 332, 333, a driving roller 334, a cleaning roller 151 referred as the outside body, and a second transfer roller 335 as the outside body of the present invention. For example, five rollers 330, 331, 332, 333, 334 are arranged inside a loop of the intermediate transfer belt 410 to tense the intermediate transfer belt 410. The cleaning roller 151 continuously contacts to clean an outer surface of the intermediate transfer belt 410 at a cleaning point 150. The cleaning roller 151 may sometimes depart from the outer surface of the intermediate transfer belt 410. The driving roller 334 is arranged adjacent and opposite to where the cleaning roller 151 contacts to the outer surface of the intermediate transfer belt 410. The driving roller 334 is driven by the belt motor M1 and drives to rotate the intermediate transfer belt 410 in anticlockwise direction, for example. A second transfer nip N2 is formed between the intermediate transfer belt 410 and the second transfer roller 335. Further the driving device 500 includes transfer rollers 36Bk, 36Y, 36M, 36C to contact an inner surface of the conveying belt 310 and to be arranged opposite the image forming members 22Bk, 22Y, 22M, 22C. An electric field of the transfer rollers 36Bk, 36Y, 36M, 36C and the image forming members 22Bk, 22Y, 22M, 22C cooperate to transfer electrostatic images to the recording medium.

According to the structure described above, the toner images on the image forming members 22Bk etc. are transferred onto the intermediate transfer belt 410 by the electric field and pressure between the image forming members 22Bk etc. and the transfer rollers 36Bk etc. while sequentially overlapping to superimpose the images on the medium. Thereby the overlapped toner images with four-color are formed on the intermediate transfer belt 410. The toner images on the intermediate transfer belt 31 are transferred onto the recording medium P by the electric field and pressure in the second transfer nip N2.

In this embodiment, the driving roller 334 is arranged adjacent and preferably opposite to where the cleaning roller 151 contacts to the outer surface of the intermediate transfer belt 410. Thereby the driving roller 334 can drive the intermediate transfer belt 410 so to more steadily compensate peripheral velocity fluctuation of the intermediate transfer belt 410 caused by driving force of the cleaning roller 151. In addition the driving roller 334 can drive the intermediate transfer belt 410 to more steadily compensate peripheral acceleration fluctuation of the intermediate transfer belt 410 caused by the driving force of the cleaning roller 151.

Figure 21:
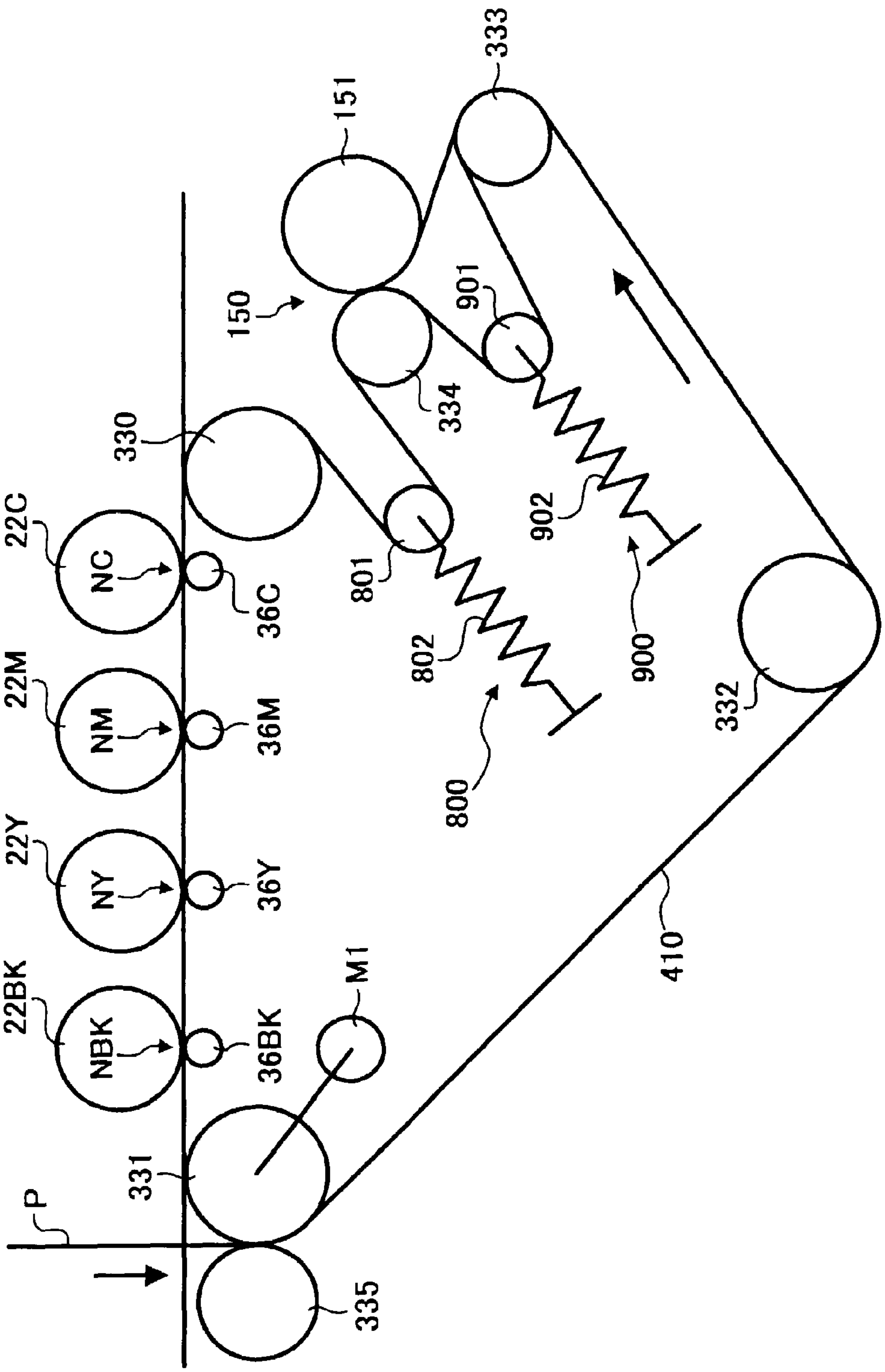
FIG. 21 is a schematic view showing a driving device according to a seventh embodiment.
Figure 22:
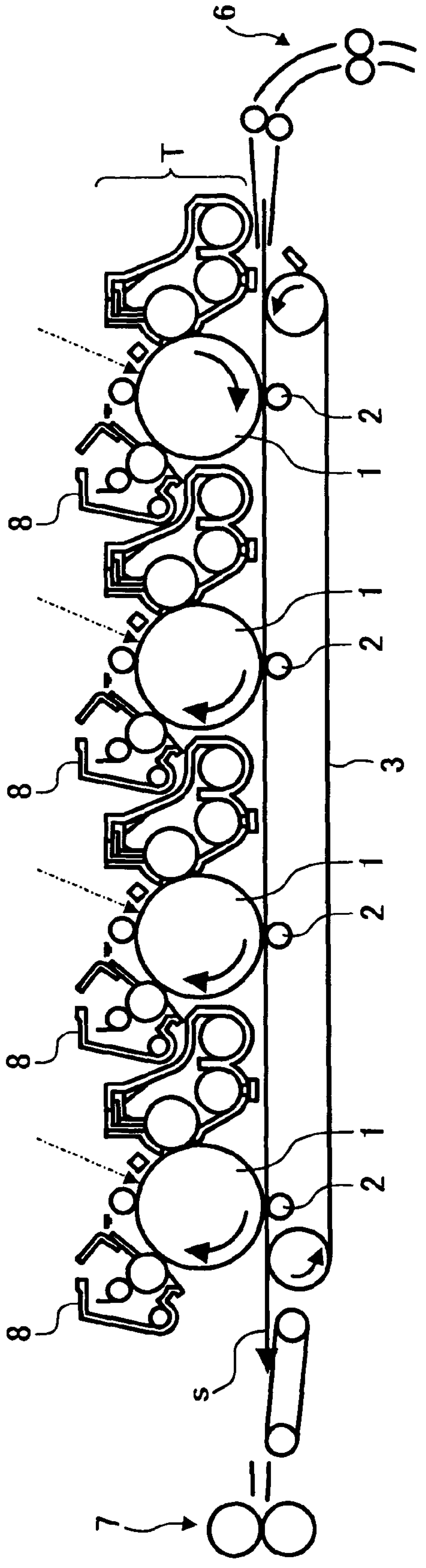
FIG. 22 PRIOR ART
FIG. 22 is a schematic front view of a prior art image forming apparatus of tandem type.
Figure 23:
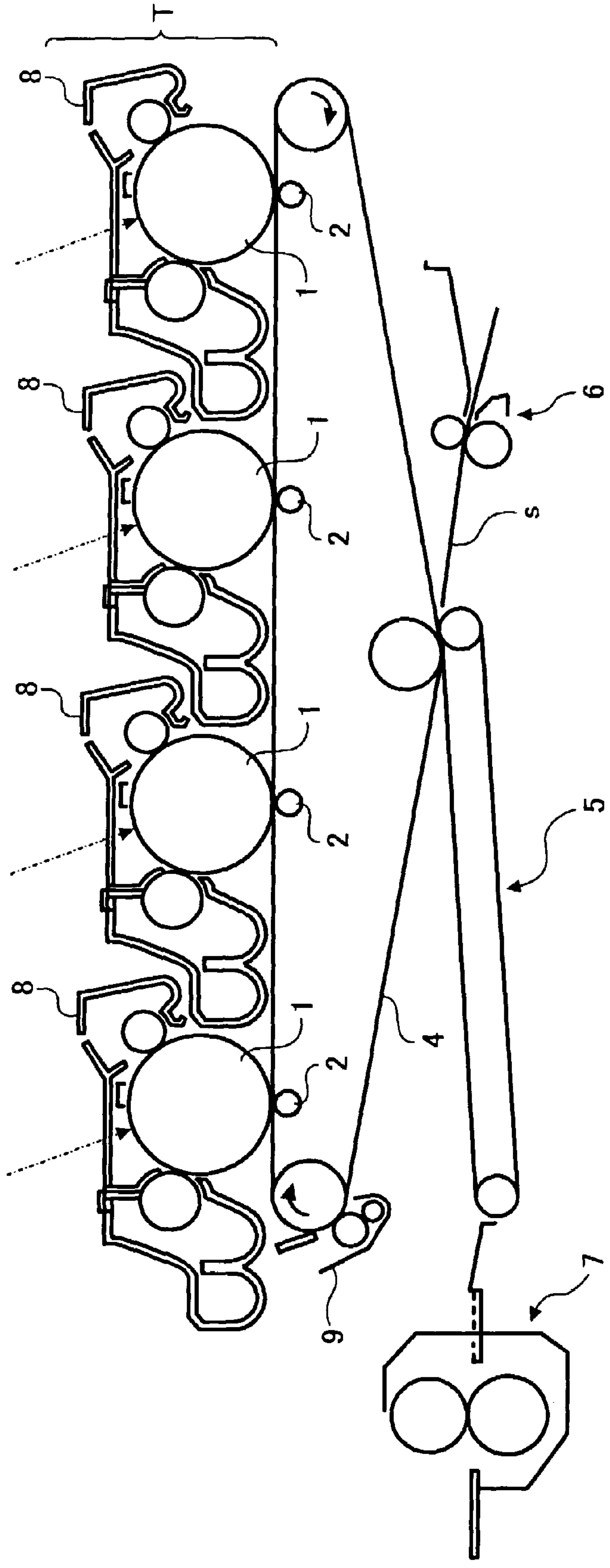
FIG. 23 PRIOR ART
FIG. 23 is a schematic front view of another prior art image forming apparatus of tandem type.

FIG. 21 is a schematic view showing a portion of the driving device 500 according to a seventh embodiment. A downstream fluctuation absorbing member 800 is arranged at downstream of the cleaning point 150 in the direction which the intermediate transfer belt 410. An upstream fluctuation absorbing member 900 is arranged at upstream of the cleaning point 150 in the direction which the intermediate transfer belt 410. In addition a roller 334 is composed of a driven roller and arranged opposite to where the cleaning roller 151 contacts to the outer surface of the intermediate transfer belt 410. Meanwhile a roller 331 is composed of a driving roller driven by the belt motor M1 to drive to rotate the intermediate transfer belt 410 in anticlockwise direction.

The downstream fluctuation absorbing member 800 includes a tension roller 801 configured to contact to the outer surface of the intermediate transfer belt 41, and a spring 802, for example, configured to pull the tension roller 801. Thereby the downstream absorbing member 800 absorbs tensional fluctuation at the downstream of the cleaning roller 151. The upstream fluctuation absorbing member 900 includes a tension roller 901 configured to contact to the outer surface of the intermediate transfer belt 41, and a spring 902 configured to pull the tension roller 901. Thereby the upstream fluctuation absorbing member 900 absorbs tensional fluctuation at the upstream of the cleaning roller 151. Therefore velocity fluctuation arising at the cleaning point 510 is prevented from dispersing toward the portion not across the cleaning point 510 on the intermediate transfer belt 410.

Further resonant frequency of the fluctuation absorbing member 800, 900 are different from the clock f determined by the transfer control circuit 650. In other words, the resonant frequency of the absorbing member is different from periodic frequency of vibration caused by that the outside body contacts the outer surface of the intermediate transfer belt 31. Thereby the fluctuation absorbing member 800, 900 are prevented from oscillating.

The foregoing discussion discloses and describes exemplary embodiments of the invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention. The disclosure, including any readily discernable variants of the teachings herein, define, in part, the scope of the foregoing claim terminology such that no inventive subject matter is dedicated to the public.

This Application claims the benefit of Japanese priority document JP 274100, filed in Japan on Sep. 19, 2002, the entire contents of which are incorporated by reference herein in its entirety.

What is claimed is:

1. A belt driving device comprising:

plural rollers including a driving roller;

a belt configured to be tensioned by said plural rollers, and to be driven by said driving roller;

a viscous damper arranged on a rotational axis of said driving roller and configured to absorb shock to said driving roller;

wherein said driving roller is arranged adjacent to where an outside body contacts an outer surface of said belt.

2. A belt driving device according to claim 1; wherein said driving roller is arranged opposite said outside body across said belt.

3. A belt driving device according to claim 2; wherein said outside body is configured to contact to clean the outer surface of said belt.

4. A belt driving device according to claim 2; wherein said outside body is a roller.

5. A belt driving device according to claim 1; wherein said belt is configured to support toner images on its surface.

6. A belt driving device according to claim 1; wherein said belt is configured to convey a recording medium.

7. A belt driving device according to claim 6; wherein said outside body is composed of said recording medium; and said driving roller is arranged opposite where said recording medium starts to be conveyed on said belt.

8. A belt driving device according to claim 7; wherein a back-end of said recording medium is nipped by resist rollers when said recording medium starts to be conveyed on said belt.

9. A belt driving device according to claim 1; wherein a resonant frequency of said viscous damper is different from a periodic frequency of vibration caused by contact between said outside body and the outer surface of said belt.

10. A belt driving device according to claim 1, further comprising:

a flywheel that is arranged on the rotational axis of said driving roller, that is configured to absorb shock to said driving roller, and that is axially offset with respect to said viscous damper.

11. A belt driving device according to claim 1; wherein said viscous damper includes a rotor contained in a casing, and a shaft portion that links said rotor to said driving roller.

12. A belt driving device according to claim 11; wherein said viscous damper includes an oil.

13. A belt driving device according to claim 11; wherein said viscous damper includes a magnetism fluid.

14. A belt driving device according to claim 11; wherein said viscous damper includes an electric generator configured to create a viscous load.

15. An image forming apparatus comprising:

plural rollers including a driving roller;

a belt configured to be tensioned by said plural rollers, and to be driven by said driving roller;

a driving shaft that links a viscous damper to said driving roller, said viscous damper being configured to absorb shock to said driving roller;

wherein said driving roller is arranged adjacent to where an outside body contacts an outer surface of said belt.

16. An image forming device according to claim 15, further comprising:

a flywheel that is linked to said driving shaft and that is configured to absorb shock to said driving roller.

17. A belt driving device according to claim 15; wherein said viscous damper includes a rotor contained in a casing, and a shaft portion that links said rotor to said driving roller.

18. A belt driving device according to claim 17; wherein said viscous damper includes an oil.

19. A belt driving device according to claim 17; wherein said viscous damper includes a magnetism fluid.

20. A belt driving device according to claim 17; wherein said viscous damper includes an electric generator configured to create a viscous load.

* * * * *